(12) United States Patent
Schwartz et al.

(10) Patent No.: US 11,734,755 B2
(45) Date of Patent: Aug. 22, 2023

(54) DYNAMICALLY DETERMINING REAL-TIME OFFERS

(71) Applicant: Synchrony Bank, Stamford, CT (US)

(72) Inventors: Lauren Schwartz, Stamford, CT (US); Nomiki Petrolla, Stamford, CT (US); Alex Muller, Stamford, CT (US); Jorge Argueta, Stamford, CT (US); Maya Mikhailov, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 217 days.

(21) Appl. No.: 17/139,435

(22) Filed: Dec. 31, 2020

(65) Prior Publication Data
US 2021/0201404 A1 Jul. 1, 2021

Related U.S. Application Data

(60) Provisional application No. 62/955,737, filed on Dec. 31, 2019.

(51) Int. Cl.
*G06Q 40/00* (2023.01)
*G06Q 40/03* (2023.01)
*G06N 20/00* (2019.01)

(52) U.S. Cl.
CPC .............. *G06Q 40/03* (2023.01); *G06N 20/00* (2019.01)

(58) Field of Classification Search
CPC ....... G06Q 40/02; G06Q 40/025; G06N 20/00

USPC ................................................. 705/4, 35–45
See application file for complete search history.

(56) References Cited

U.S. PATENT DOCUMENTS

| | | | |
|---|---|---|---|
| 2013/0144715 A1* | 6/2013 | Kranzley | G06Q 30/0251 705/14.49 |
| 2016/0171555 A1* | 6/2016 | Buerger | G06Q 40/025 705/14.66 |
| 2020/0327604 A1* | 10/2020 | Morin | G06N 20/00 |
| 2020/0380551 A1* | 12/2020 | White | G06Q 40/025 705/14.66 |

* cited by examiner

*Primary Examiner* — Jessica Lemieux
*Assistant Examiner* — Mohammed H Mustafa
(74) *Attorney, Agent, or Firm* — Polsinelli LLP

(57) ABSTRACT

Disclosed are systems and techniques for dynamically providing real-time offers. For instance, user eligibility for one or more offers can be determined based on a plurality of dynamic user attributes associated with the user and one or more data sets corresponding to similarly situated users. An input can be received corresponding to an acceptance by the user of at least one offer selected from the one or more offers. In response to receiving the input, an updated plurality of the dynamic user attributes can be retrieved, wherein the dynamic user attributes are constantly updated in real time based on user activity. Based on the updated plurality of dynamic user attributes and the one or more data sets corresponding to the similarly situated user, it can be determined whether the user remains eligible for the at least one offer. An offer confirmation can be sent upon confirming eligibility.

21 Claims, 26 Drawing Sheets

FIG. 15B

DYNAMICALLY DETERMINING REAL-TIME OFFERS

CROSS REFERENCE TO RELATED APPLICATIONS

This application claims priority to U.S. Provisional Application 62/955,737 filed on Dec. 31, 2019, the entire content of which is incorporated herein by reference.

BACKGROUND OF THE INVENTION

Field

The present disclosure relates generally to credit transactions. In one example, the systems and methods described herein may be used to dynamically determine real-time offers.

Background

Presently, companies and financial institutions present loan offers to consumers that are based on consumer credit reports with little, if any, data relating to previous transactions by the consumer. This procedure is highly formulated and fails to provide many personalized options on how to proceed by the consumer. The consumer is typically presented with a "take it or leave it" offer without any consideration of past information and selections by the consumer. Moreover, a consumer's eligibility for a loan offer can change quickly and such changes in status may not be considered by conventional methods. In addition, consumers that have not established their credit history are typically not eligible for loan offers.

There is, therefore, a need in the art for improved systems and methods that are capable of providing customized real-time offers that can be based on user attribute data and that can be repeatedly updated in real-time. Unlike previous systems that are solely based on credit score reports and loan amounts, the present techniques can provide individually tailored offers in real time and avoid risk due to changing conditions.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for determining real-time offers. According to at least one example, a computer-implemented method is provided. The computer-implemented method comprises determining eligibility for one or more offers for a user based on a plurality of dynamic user attributes associated with the user and one or more data sets corresponding to similarly situated users. The method further comprises receiving an input corresponding to an acceptance by the user of at least one offer selected from the one or more offers. The method further comprises in response to receiving the input, retrieving an updated plurality of the dynamic user attributes associated with the user, wherein the dynamic user attributes are constantly updated in real time based on user activity. The method further comprises determining, based on the updated plurality of the dynamic user attributes and the one or more data sets corresponding to the similarly situated users, whether the user remains eligible for the at least one offer. The method further comprises in response to determining that the user remains eligible for the at least one offer, sending an offer confirmation.

According to some embodiments, a system is provided. The system comprises one or more processors and memory storing thereon instructions that, as a result of being executed by the one or more processors, cause the system to perform the steps of the above method.

According to some embodiments, a non-transitory, computer-readable storage medium is provided. The non-transitory, computer-readable storage medium stores thereon executable instructions that, as a result of being executed by one or more processors of a computer system, cause the computer system to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

FIGS. 15A and 15B illustrate an example of a offer management process, in accordance with some examples.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The disclosed technologies address a need in the art for improvements in financial institutions including providing tailored offers in real-time. Artificial intelligence and machine learning algorithms can be used to dynamically determine whether users are eligible for offers having a particular set of parameters and can also determine whether users are likely to accept an offer, reject an offer, and/or repay an offer. The machine learning algorithms can determine real-time offers based on user attributes that are constantly updated as well as data sets associated with similarly situated users. A feedback mechanism can be implemented such that the machine learning algorithm continues to learn based on each user interaction.

Figure 1:
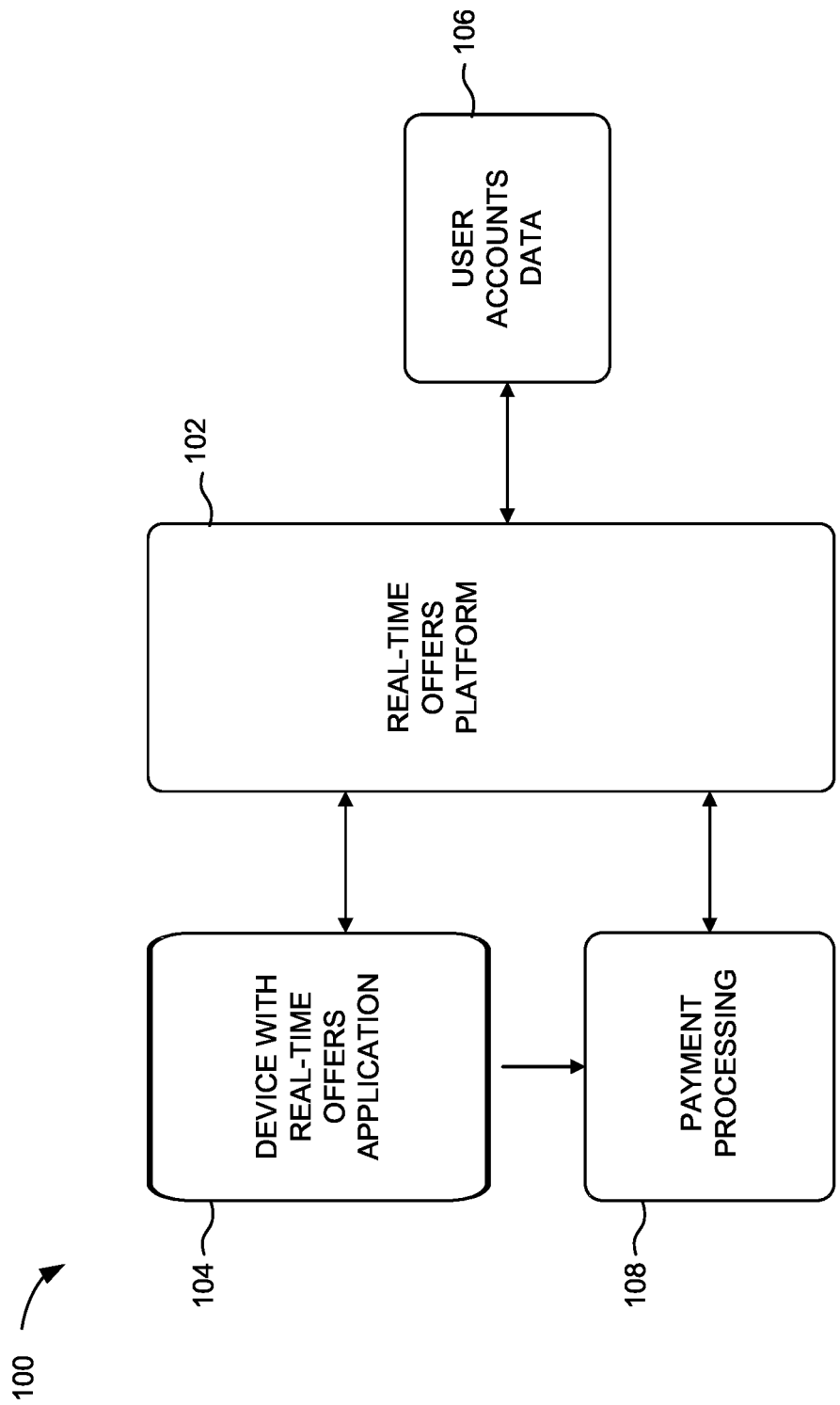
FIG. 1 illustrates an example of a topology of a loan transaction system, in accordance with some examples.

FIG. 1 illustrates an example of system 100 for dynamically determining and utilizing real-time offers, in accordance with some examples. In some embodiments, the system 100 can include a real-time offers platform 102 that can be configured to dynamically process data in order to formulate offers (e.g., credit offers, loan offers, purchase incentive offers, etc.) for customers. The real-time offers platform 102 can be implemented on a computer system or other system (e.g., server, virtual machine instance, etc.). Alternatively, the real-time offers platform 102 may be implemented as an application or other process executed on a computer system of a credit provider. The system 100 can also include one or more devices that are configured to execute a user application for real time offers (e.g., device 104) as well as user accounts data 106 and payment processing module 108.

In some examples, real-time offers platform 102 can communicate with device 104 in order to send and receive data relating to real-time offers that are presented to a user of device 104. The real-time offers application can be implemented as an internet application, a web application, a mobile application, or any other application suitable for the intended purpose. The real-time offers application can be configured to interface with other applications on the device or on different devices that are associated with device 104. For example, real-time offers application can be configured to interface with applications such as FaceBook™, WhatsApp™, Google Home™, etc. Device 104 can include any type of electronic device such as a laptop, mobile phone, tablet, Internet-of-Things (IoT) device, desktop computer, server, point-of-sale (POS) device, etc.

In further examples, device 104 may also be configured to facilitate electronic payment by using, for example, a digital card, an electronic payment application, or any other software and/or hardware configuration for processing an electronic payment. Device 104 may communicate with payment processing module 108 to apply or process payments relating to one or more real-time offers. Payment processing module 108 can further communicate with real-time offers platform 102 to assist in processing payments and/or to send and receive data relating to payments received, payment due dates, past-due payments, etc.

Real-time offers platform 102 can further access and/or communicate with one or more databases that include data relating to users associated with the real-time offers application. For example, real-time offers platform 102 can access user accounts data 106 which can include information relating to users including bank account information, digital wallet information (e.g., Venmo™, ApplePay™, Google Pay™, Paypal™, etc.), or any other account information relating to the user. In some examples, real-time offers platform 102 can access user accounts data 106 from third-party service providers based on a federation between real-time offers platform 102 and the third-party provider in which real-time offers platform 102 performs authentication of the user and then communicates with the third-party provider to confirm the authentication. In other examples, the user may provide some form of personally identifiable information (PII) such as a social security number, date of birth, address, telephone number, email address, PIN, etc. that the real-time offers platform 102 can use to authenticate with and retrieve information from third-party providers.

Real-time offers platform 102 can utilize a machine learning model or artificial intelligence (AI) techniques to determine, derive, formulate, evaluate, or otherwise process real-time offers. In some examples, the machine learning techniques can include supervised machine learning techniques such as neural networks, linear and logistics regression, classification trees, support vector machine, any other suitable supervised machine learning technique, or any combination thereof. For instance, a dataset of sample user accounts data and corresponding real-time offers or rejections can be selected for training of the machine learning algorithms or artificial intelligence. In some examples, the inputs can be obtained from administrators or other entities associated with the real-time offers platform 102. The machine learning algorithm or artificial intelligence may be evaluated to determine, based on the sample inputs supplied to the machine learning algorithms or artificial intelligence, whether the machine learning algorithms or artificial intelligence are providing accurate and/or appropriate real-time offers or other determinations (e.g., rejections, etc.) for each sample user. Based on this evaluation, the machine learning algorithms or artificial intelligence may be modified (e.g., one or more parameters or variables may be updated) to improve the accuracy of the machine learning algorithms or artificial intelligence in determining an appropriate determination (e.g., real-time offer, rejection, etc.) for a user based on the provided inputs for the user.

In other examples, the real-time offers platform 102 can utilize a machine learning model or artificial intelligence trained using unsupervised learning techniques to determine whether to extend a real-time offer to a user and, if so, the parameters of the real-time offer (e.g., spending limits, interest rates, term, etc.). For instance, a dataset of input user information for various users (e.g., user accounts data 106 for each user, other spending or loan/credit information for each user, etc.) may be analyzed using a clustering algorithm to identify real-time offer parameters and determinations for certain types of users. Example clustering algorithms that may be trained using this dataset maintained by the real-time offers platform 102 to determine a user's eligibility for a real-time offer and the parameters of such an offer may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of the machine learning model or artificial intelligence, the real-time offers platform 102 may determine whether to extend a real-time offer to a user and, if so, the parameters of the real-time offer (e.g., credit limits, interest rates, etc.).

In one embodiment, the real-time offers application on device 104 can provide data relating to the user to the real-time offers platform 102 that can be used as inputs to a machine learning model or artificial intelligence algorithm that is configured to develop real-time offers. For instance, real-time offers platform 102 can receive inputs from the real-time offers application relating to a user's preferences for different goods, vendors, stores, restaurants, activities, locations, etc. Device 104 can obtain this information based on a user's interaction with device applications, web surfing history, social media, geolocation, etc. In one example, a user may grant real-time offers application access to device location information (e.g., GPS coordinates) which can be used to track places the user visits to further derive user preferences. In another example, real-time offers platform 102 can access user bank statements (e.g., Venmo™, Paypal™, Bank of America™, etc.) and analyze a user's spending habits to determine user preferences. In other examples, the real-time offers application can provide a user interface that permits a user to enter preferences. For instance, a user may specify that he/she would only like to receive offers relating to travel or that the user does not want to receive any offers relating to dining.

Real-time offers platform 102 may use this information, together with any available information from user account data 106 or any other database relating to the user as well as similarly-situated users, as input to a machine learning model or artificial intelligence to formulate an offer for credit or a loan. For example, real-time offers platform 102 may receive information relating to a user browsing for hotels in a particular city and determine that the user may be interested in an offer for plane tickets to that city. Real-time offers platform 102 may then utilize the machine learning model or artificial intelligence to formulate an offer for purchase of the plane tickets with particular re-payment terms that are uniquely derived using machine learning or artificial intelligence based on the user's profile as well as data relating to similarly situated users.

Upon formulating one or more customized offers for the user, real-time offer engine can send the offers to device 104 via the real-time offers application. The user can be presented with one or more offers and can accept or reject them. If the user wishes to accept an offer, the real-time offers application can send a signal or instruction to real-time offers platform 102 that communicates the user's acceptance. In some examples, the real-time offers platform 102 can determine whether the user remains eligible for the offer by retrieving updated data associated with the user and utilizing machine learning or artificial intelligence algorithms to evaluate and/or predict the user's behavior with respect to the offer (e.g., likelihood of accepting the offer, likelihood of making first payment, likelihood of repayment at different intervals, etc.).

In some implementations, real-time offers platform 102 can send offers to device 104 that include temporal thresholds. For example, an offer may be provided to a user that must be accepted within a pre-determined period of time or it will expire. Once the offer has expired, the user may be unable to review and/or accept the offer. For instance, the real-time offers platform 102 may remove the offer from the real-time offers application such that the offer is no longer viewable via the device 104. In another example, acceptance of an offer after a set amount of time can trigger re-evaluation of the user's eligibility for the offer. If the user is no longer eligible for the offer, the real-time offers platform 102 may transmit a notification to the real-time offers application to indicate that the offer is no longer valid for the user. Alternatively, if the user is no longer eligible for the offer, the real-time offers platform 102 may use the user's updated user account data to determine whether the user is eligible for a new real-time offer. If so, the real-time offers platform 102, via the real-time offers application, may present this new real-time offer to the user in place of the previously presented real-time offer. In some instances, a user may remain eligible for an offer with updated terms and conditions. Further details with respect to the real-time offers platform 102 will be provided in connection with ensuing figures.

Figure 2:
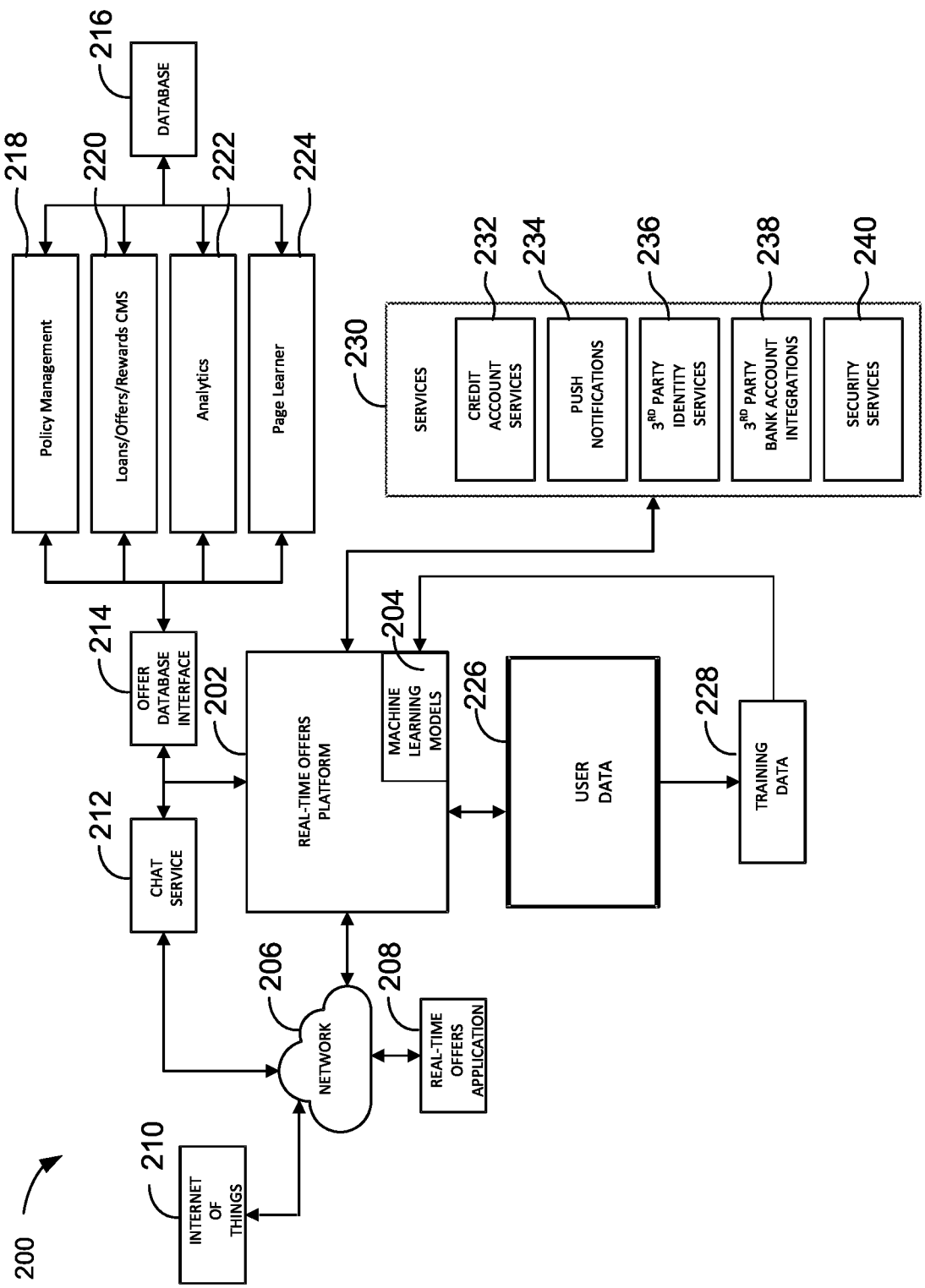
FIG. 2 illustrates an example of a flowchart of a high level functional architecture, in accordance with some examples.

FIG. 2 illustrates an example of a functional architecture of system 200 for dynamically determining and utilizing real-time offers. System 200 can include real-time offers platform 202 which can be configured to dynamically process data in order to formulate and process real-time offers. In some examples, real-time offers platform 202 can include artificial intelligence or machine learning models 204. As noted with respect to FIG. 1, machine learning models 204 can be configured to implement algorithms for performing supervised and unsupervised machine learning.

In formulating real-time offers, real-time offers platform 202 can be configured to communicate over network 206 with a device that is configured to execute real-time offers application 208. The device that executes real-time offers application 208 can include any type of electronic device such as a laptop, mobile phone, tablet, Internet-of-Things (IoT) device, desktop computer, server, etc. As part of the communication with a device executing real-time offers application 208, real-time offers platform 202 can be configured to identify and authenticate a user and/or a device that is associated with real-time offers application 208. Authentication of a device or user can be performed based on a password, biometric scanning, certificate, token, multi-factor authentication, any other suitable authentication method, or any combination thereof. For instance, a user, via the real-time offers application 208, may register for an account with the real-time offers platform 202. During this registration process, the user may create a username and create or otherwise provide credential information (e.g., password(s), biometric information, etc.) that may be used by the real-time offers platform 202 for authentication of the user. In some examples, the real-time offers platform 202 may automatically generate or coordinate with the user for the creation of credential information, such as tokens, digital certificates, and the like.

In order to formulate real-time offers, real-time offers platform 202 can store and/or otherwise access user data 226. In some examples, user data 226 can be encrypted data and real-time offers platform 202 can be configured to decrypt the data. For example, an encrypted data model can be where user data 226 is stored as encrypted blobs or blocks using symmetric or asymmetric cryptographic methods. User data 226 can include user attributes that are directly and uniquely associated with individual users, such as name, age, location, bank account data (e.g., institutions, types, balance, transactions, account number(s), routing number(s), etc.), education, employment, occupation, income, demographics, digital wallet(s), credit score(s), loan/credit history (e.g., open loans/credit, loans paid off, late payments, defaults, etc.), browsing history, spending patterns, user preferences, dislikes, etc.

In some examples, one or more of the user attributes stored as part of user data 226 are constantly updated in real-time based on user activity. For example, a user's bank account balance can be updated in real-time when a user makes a deposit or a withdrawal. In another example, user preferences can be updated and/or derived in real-time based on a user's activity, which can include interaction with applications on a user device (e.g., interne browsing, digital wallet, shopping, dining, etc.) as well as offline activity. For instance, a user's bank records can include debit card purchases made at different vendors which can be used to derive a user preference for particular types of vendors and/or particular types of goods.

In some implementations, real-time offers platform 202 can obtain user data 226 in real time by utilizing federated identities. For instance, real-time offers platform 202 can utilize a token or some other authentication mechanism that can be used to access one or more third-party systems. In another example, real-time offers platform 202 can utilize single sign-on technology to obtain user authentication that can be used to access third-party service providers. For example, a user may sign-in or authenticate with real-time offers platform 202, which can then utilize the user's credentials to access banking applications, credit cards, digital wallets, etc. In other implementations, real-time offers platform 202 may obtain user data 226 in real time by utilizing a service such as $3^{rd}$ party identity services 236 or $3^{rd}$ party bank account integrations 238, discussed further below.

In some examples, user data 226 can also include one or more data sets corresponding to user attributes that are compiled from one or more groups of other users (e.g., other credit recipients). In some implementations, data sets corresponding to other users can be based on historical user data and determinations made by a credit provider. In other implementations, data sets corresponding to other users can include contemporaneous data obtained from other users that interact with real-time offers platform 202. In some aspects, the data sets can also include default data such as default interest rates, default term, default credit limits, etc. that can be associated with one or more user attributes. In some examples, machine learning models 204 can be used to derive sets of similarly situated users from the other user data sets, which can then be correlated with individual data to derive real-time customized offers for users.

For example, machine learning models 204 may be trained using unsupervised learning techniques. For instance, a dataset of training data 228 (including one or more data sets of user attributes corresponding to other users) can be derived from user data 226 and may be analyzed using a clustering algorithm to identify the types of users and related user attributes (e.g., clusters) that are likely to accept an offer with a particular set of parameters. In some embodiments, training data 228 can also include one or more rules that are part of policy management 218, as described further below. In another example, training data 228 can be analyzed by the machine learning algorithm to identify users and related user attributes that are likely to comply with the terms of an offer, such as making on time repayment. In another example, training data 228 may be analyzed using a clustering algorithm to identify the types of offers that users with one or more user attributes are not likely to accept. In another example, training data 228 may be analyzed using a clustering algorithm to determine whether an offer should be extended to a particular user based on one or more user attributes. Example clustering algorithms that may be trained using training data 228 can include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of the machine learning models 204, real-time offers platform 202 may determine whether to extend an offer to a user via real-time offers application 208. Further, the response from the user of real-time offers application 208 can be used to further train machine learning models 204.

In other examples, machine learning models 204 may be trained using supervised learning techniques. For instance, training data 228 may include selected data sets of user attributes and corresponding real-time offers for training of the machine learning models 204 or artificial intelligence algorithms. In some examples, the inputs can be obtained from administrators of real-time offers platform 202 (as illustrated and described below in connection with FIG. 4) or other sources associated with real-time offers platform 202. The inputs can include rules associated with policy management 218 that can train machine learning models to enforce individual lender policies. The machine learning models 204 or artificial intelligence may be evaluated to determine, based on the training data 228 supplied to machine learning models 204 or artificial intelligence, whether the machine learning models 204 are providing accurate offers for each user. Based on this evaluation, the machine learning models 204 may be modified (e.g., one or more parameters or variables may be updated) to improve the accuracy of the machine learning algorithms or artificial intelligence in determining an appropriate offer for a user or a user profile (e.g., user with certain set of attributes) based on the provided inputs.

In some aspects, system 200 can also include one or more Internet of Things (IoT) devices 210 such as Google Home™, Alexa™, Apple HomePod™, or any other IoT. The IoTs 210 can communicate with real-time offers platform 202 and with real-time offers application 208 via network 206. In some examples, system 200 may include a chat service 212 that can be used to provide communication between real-time offers platform 202 and IoTs 210 and/or real-time offers application 208. For instance, chat service 212 can be configured to send and receive data relating to real-time offers to a user of real-time offers application 208. In some implementations, real-time offers platform 202 can be accessed from IoTs 210 by utilizing an applet, for example.

Chat service 212 may provide an automated interface in which a user may select from a group of pre-determined inputs in order to send feedback to real-time offers application 208. The messages sent via chat service 212 may be determined in real-time by real-time offers platform 202 based on machine learning models 204. One example of a message sent via chat service 212 may include a prompt for a user to either accept or reject a real-time offer. In some embodiments, chat service 212 may include an option to chat with an operator that can provide live assistance to a user.

In some configurations, real-time offers platform 202 may include or otherwise communicate with an offer database interface 214 that can provide access to read or write data to database 216. In some examples, database 216 can include data relating to policy management 218, loans/offers/rewards content management system (CMS) 220, analytics 222, and/or page learner 224. For instance, policy management 218 may include one or more rules associated with offers that can be used by machine learning models 204 to assist in formulating real-time offers. For example, policy management 218 may include a rule that a user that does not have a minimum bank account balance cannot qualify for an offer that is greater than a particular monetary threshold regardless of other user attributes. In some examples, the real-time offers platform 202 can use machine learning models 204 to generate rules that may be used to determine whether users qualify for an offer. For instance, the machine learning models 204 may use historical user data, as well as corresponding offer determinations made by entities associated with the real-time offers platform 202 (e.g., agents, loan officers, etc.), to identify possible rules that may be implemented. As an illustrative example, if users having a bank account balance below a certain amount have been frequently determined to not qualify for an offer, the machine learning models 204 may determine that a rule may be implemented whereby any user having a bank account balance below this certain amount does not qualify for an offer. Thus, the machine learning models 204 may cluster user characteristics and derive rules based on these clusters. CMS 220 can include data for managing content relating to real-time offers or rewards. For example, CMS 220 can include data relating to vendors associated with offers, offer categories (e.g. dining, travel, leisure, sport, music, etc.) or any other type of related content. Analytics 222 can include a dashboard and associated data relating to real-time offers. Analytics 222 can be used by real-time offers platform 202 to determine, obtain, or provide statistical data relating to real-time offers and associated user attribute data. Page learner 224 can be used by real-time offers platform to assist with application or webpage interface configuration (e.g., capture and/or insert data to a webpage or a related user interface).

In some configurations, real-time offer platform 202 can also include, utilize, or otherwise communicate with one or more services 230. Services 230 can include web services as well as mobile commerce services. For instance, services 230 can include credit account services 232, push notification services 234, $3^{rd}$ party identity services 236, $3^{rd}$ party bank account integration services 238, and security services 240 (e.g., know your customer (KYC), Liveness, and IDS). In some examples, $3^{rd}$ party bank account integration services 238 can be used by real-time offers platform 202 to obtain real-time data relating to a user's bank account. Real-time offers platform 202 can use the real-time banking data from $3^{rd}$ party bank account integration services 238 as part of the dataset that is used to make a real-time determination of a user's eligibility for one or more real-time offers. Real-time offers platform 202 may access one or more of services 320 based on user data 226 in order to derive real-time offers.

Figure 3:
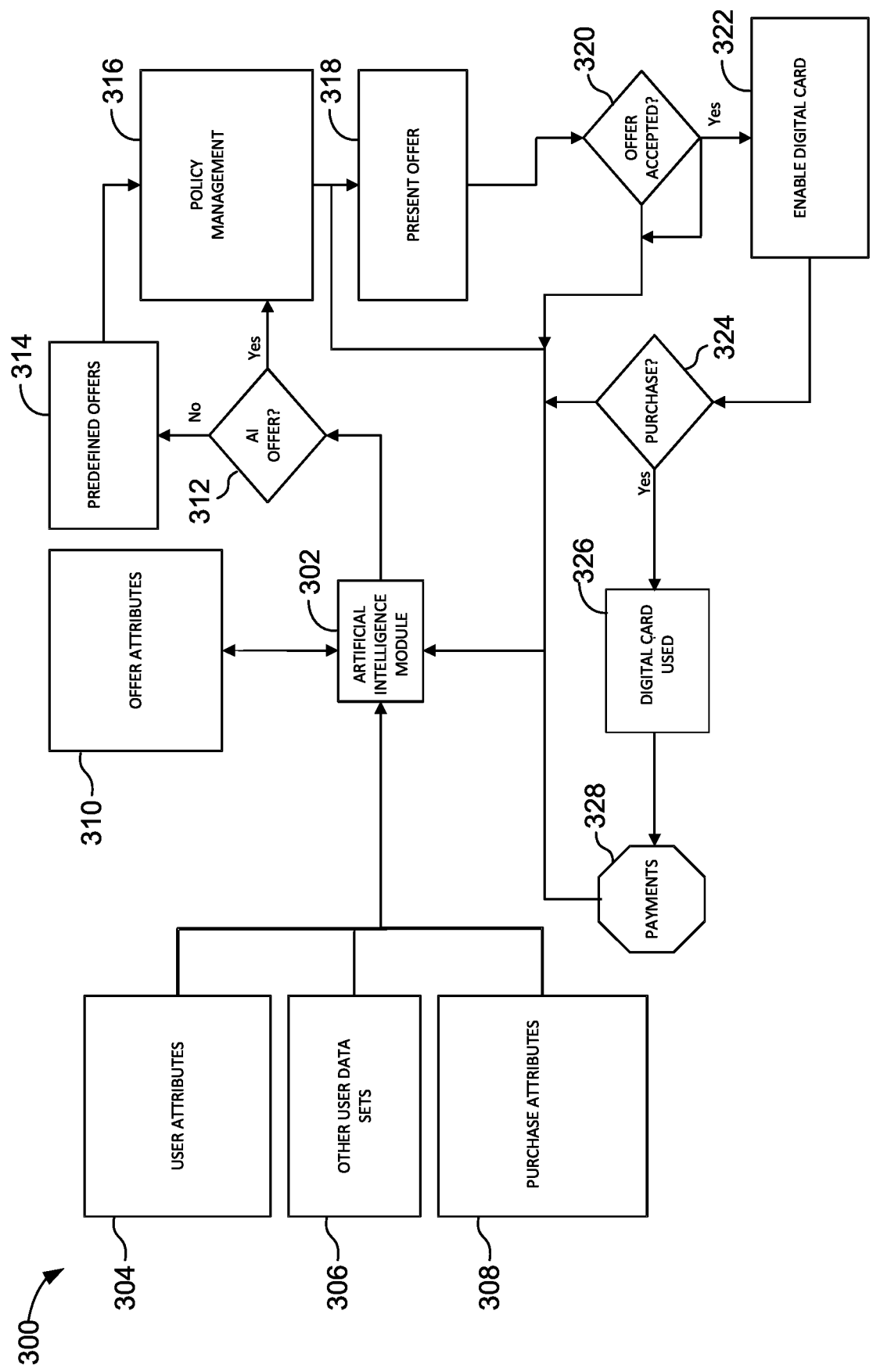
FIG. 3 illustrates an example of a flowchart of a loan offer engine, in accordance with some examples.

FIG. 3 illustrates an example of a flowchart of a real-time offer platform 300, in accordance with some examples. Real-time offer platform 300 can include an artificial intelligence module 302 that is configured to implement one or more artificial intelligence or machine learning algorithms. Artificial intelligence module 302 can implement its algorithms utilizing different data as inputs. For example, artificial intelligence module 302 can receive inputs corresponding to user attributes 304, other user data sets 306, and purchase attributes 308. As noted above, user attributes 304 can include age, location, loan history, bank account data, digital wallet data, user preferences, etc. User attributes 304 can be updated dynamically in or near real-time such that artificial intelligence module 302 can determine real-time offers based on the most up-to-date user attributes 304. For example, if a user submits payment to a third-party loan, the payment information can be obtained in real-time either through a push mechanism in which the data is dynamically sent to real-time offer platform 300 or through a pull mechanism in which real-time offer platform requests the data from a third-party loan provider. In some implementations, real-time offer platform 300 can be configured to query for new user data (e.g., via services 230) periodically. Additionally, real-time offer platform 300 can be configured to query for new user data on demand when it is deriving a real-time offer for a particular user.

Artificial intelligence module 302 can also receive data corresponding to other user data sets 306. Other user data sets 306 can include data relating to one or more of the user attributes 304 compiled for a group of users, such as other users of the real-time offers platform. Additionally, the other user data sets 306 can include historical data relating to one or more of the user attributes 304 compiled for users that have previously received offers from a credit provider associated with the real-time offers platform. Other user data sets 306 can be processed by artificial intelligence module 302 in order to derive data sets of similarly situated users that can be organized according to one or more characteristics that can be used to correlate the other user data sets 306 with a particular user. For instance, a portion of the other user data sets 306 may be organized according to user age and user bank account balance. Artificial intelligence module 302 may then obtain and evaluate other user data sets 306 based on one or more of the user attributes 304.

In some embodiments, other user data sets 306 can be used as training data for artificial intelligence module 302. For example, other user data sets 306 can include data relating to one or more offers that are associated with one or more user attributes or sets of attributes for one or more users. Artificial intelligence module 302 can utilize the other user data sets 306 to perform machine learning and derive additional user attributes that can be associated with certain criteria pertaining to offers. For example, artificial intelligence module 302 can determine that a male user within the age of 20-25 having an income level greater than $40 k per year is more likely to accept an offer to a sporting event than a similarly situated user having an income between $20-30 k per year.

The purchase attributes 308 can include data relating to monetary amount, tickets to events, travel plans, product categories, merchants, information from a website's page that include price and transactional content, or any other purchase attribute suitable for the intended purpose and understood by a person of ordinary skill in the art. In some examples, purchase attributes 308 can be obtained by artificial intelligence module 302 based on a request for an offer that is received from a user. In other examples, purchase attributes 308 can be obtained after an offer has been extended to a user. For instance, artificial intelligence module 302 may derive an offer for travel to California based on the user's research of tourist activities in San Francisco as well as the user's spending habits. The offer may be presented to include flight information on a specific airline from the user's home in Miami to San Francisco for five days. In response, the user may request a modification of the number of days, the airline, and/or the airports. If the requested changes are approved, real-time offer platform 300 can update one or more of purchase attributes 308, other user data sets 306, user attributes 304, and offer attributes 310, which can all be used by artificial intelligence module 302 for further learning in deriving real-time offers.

In some examples, artificial intelligence module 302 can utilize all or part of user attributes 304, other user data sets 306, and purchase attributes 308 to determine a real-time offer having offer attributes 310. Offer attributes 310 can include a credit limit or credit range, an interest rate, a deposit amount, a term, a vendor or merchant, pre-defined rules/logic, and/or any other offer attribute suitable for the intended purpose. For example, real-time offers platform 300 may detect that a user is browsing for jewelry items online and has also visited a Pandora™ store in the mall (e.g., via location data obtained by an application on a user device). Based on this activity and additional user attributes (e.g., income and bank account balance), real-time offers platform 300 may use artificial intelligence module 302 to derive an offer for a credit limit of $1,000 at 10% interest to be paid in a 12-month period that can be used in a jewelry store. In some examples, the set or range of offer attributes 310 may be provided as inputs to artificial intelligence module 302.

In some implementations, artificial intelligence module 302 may assign one or more scores to different user attributes and/or to offer attributes. The user attribute scores and the offer attribute scores can be processed to determine whether a particular user qualifies for a particular offer. For example, an interest rate of 0% for the first 12 months may be offered only if a user has a minimum income score or a minimum bank account balance score, or some combination thereof. In further implementations, artificial intelligence module may determine one or more thresholds that are associated with one or more offer attributes. For example, a credit limit greater than $50K may require a threshold bank account balance of $100K.

Upon processing the various inputs, real-time offers platform 300 can determine at decision 312 whether it is able to derive a real-time offer that satisfies parameters based on the artificial intelligence algorithm. If an offer cannot be derived by artificial intelligence module 302, an offer can be selected from predefined offers 314. Predefined offers 314 can include a decision matrix, look up table, or other suitable database that can be used to select an offer based on certain criteria. For example, predefined offers 314 can include examples such as if a user X has a credit score between 500-600 and account balance of $5K, then an offer including a $500 credit limit at 15% can be presented.

Once real-time offers platform 300 formulates an offer, either via AI or via predefined offers 314, real-time offers platform 300 can implement policy management 316, which can include rules for ensuring offers comply with a financial institute's policies. For example, a financial institution may implement policy management 316 including a rule that no offers are to be made if a user's bank account balance is less than $500 regardless of any other criteria. In this instance, a particular user having user attributes (e.g., high income, high credit score) that would otherwise qualify for an offer may be disqualified by policy management 316. In other examples, the rules from policy management 316 can be provided as inputs to artificial intelligence module 302 such that artificial intelligence module 302 can automatically yield a "no offer" result if one or more rules apply.

Real-time offers platform 300 can present an offer to a user at 318. The offer presented to the user can include particular offer attributes 310 such as 15% interest rate, $500 prepayment (i.e., deposit), and $150 payments for 12 months (i.e., term). In some implementations, the offer presented can include a dynamic range of parameters that permits the user to customize the offer. For example, artificial intelligence module 302 may derive various offers for a user which have different parameters that are dependent on one another (e.g., higher prepayment can qualify for lower interest rate). For instance, an offer including a credit range, an interest range, a pre-payment range, and a term range can be presented with the different parameters and associated ranges such that the user can dynamically change them to select the offer that best suits the user. Changes to offer attributes can be provided as feedback to artificial intelligence module 302 to perform additional reinforcement training that can assist in deriving offers for similarly situated users.

Upon presenting the offer, real-time offers platform 300 can detect user input at 320 that indicates whether the offer was accepted or rejected. The user's decision to accept or reject an offer can be provided as feedback to artificial intelligence module 302 in order to further train the model. For instance, if the user rejects the offer, variables can be adjusted to identify offers that are more likely to be accepted in the future. For example, if a user rejects an offer to purchase tickets to a rock concert, that user's attributes can be added to the other user data sets to help predict another user's response. In some implementations, artificial intelligence module 302 may receive the rejection and formulate a new offer for the user. For example, the artificial intelligence module 302 may determine that the user is likely interested in the rock concert tickets but did not agree because the terms were not favorable, and may determine whether a better interest rate can be offered in order to entice the user to accept the offer. Alternatively, if the user accepts the offer, such acceptance can provide further data reinforcing the model's decisions.

If a user accepts the offer, real-time offers platform may enable a digital card 322 that can facilitate a purchase by the user. In other implementations, a user acceptance can trigger alternative methods for making the purchase such as mailing of a credit card to the user, mailing a gift card to the user, transferring funds to the user's digital wallet, etc. The digital card may include parameters that limit the amount of credit, the merchant or location where it can be used, the time for use, etc. In some instances, the digital card can include a credit limit that is a certain percentage above the loan amount to account for sales tax, transaction fees, or any other fees/costs that may be incurred by the user in the course of the purchase.

Once the digital card is activated, real-time offers platform 300 can monitor to determine if purchase was made at 324. If the user does not utilize the digital card to make a purchase, that data can be provided to artificial intelligence module 302. In some examples, real-time offers platform may remind the user to utilize the digital card before a certain timeframe. In other examples, the digital card may expire due to non-use, and a new real-time offer can be derived and presented to the user.

Upon use of the digital card at 326, real-time offers platform 300 can recalculate the final loan amount and loan parameters. For example, in some implementations the offer may provide for an upper credit limit that the user is not required to use in its entirety. Once a purchase is made, offer terms (e.g., amount, time, etc.) can be recalculated and presented to the user. Data relating to the use of digital card can also be provided to artificial intelligence module 302 as training input. For example, the time it took for the user to utilize the card and the vendor where the card (if not restricted) can be provided as feedback to artificial intelligence module 302. Real-time offers platform 300 can utilize web services such as credit account services 232 to schedule payments and provide a payment interface.

Real-time offers platform 300 provides further training data to artificial intelligence module 302 as the user makes payments 328 associated with an offer. For example, on-time payments can be associated with the user's other attributes and can be added to the similar user data sets 306. Similarly, missed or late payments can also be used to train artificial intelligence module 302, which can associate the payment with the particular user attributes. Payments 328 can be tracked for any given user throughout the life of an offer and used to further refine machine learning algorithms implemented by artificial intelligence module 302.

Figure 4:
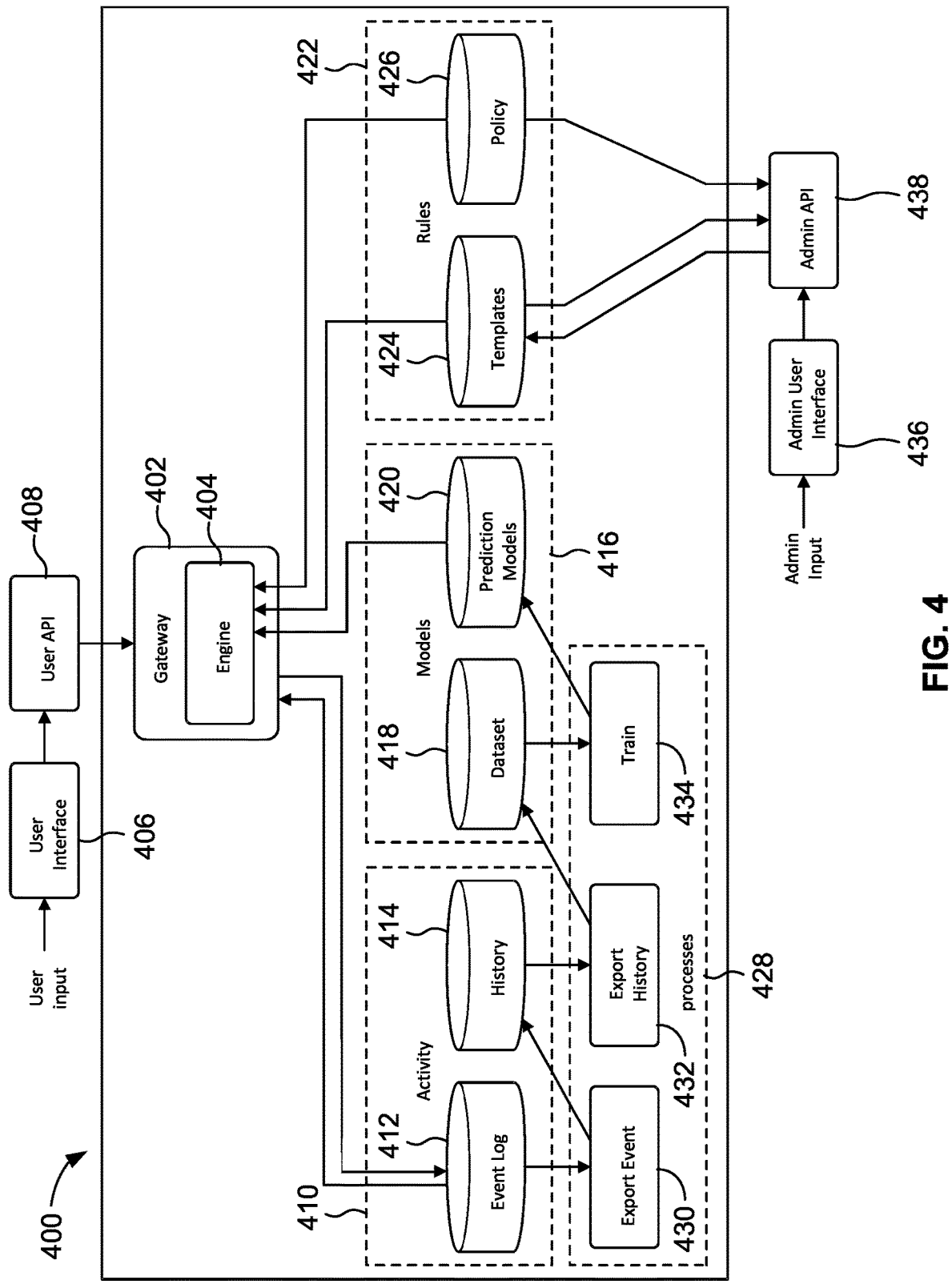
FIG. 4 illustrates an example of a flowchart of a machine learning data flow, in accordance with some examples.

FIG. 4 illustrates an example of machine learning data flow 400, in accordance with some examples. The machine learning data flow 400 can be implemented by a real-time offers platform, such as platform 300 illustrated in FIG. 3. In some examples, machine learning data flow 400 can include a gateway 402 having an engine 404 that can be configured to receive data regarding user activity 410, models 416, and rules 422. Machine learning data flow can also include one or more processes 428 such as export event process 430, export history process 432, and training process 434.

In some implementations, data relating to user activity 410 can be stored in event log 412 and in user history 414, which can be implemented as a database, a server, or any other suitable device that can be configured to store data. For example, machine learning data flow 400 can include a user interface 406 that can be implemented with a user application programming interface (API) 408. In some embodiments, user interface 406 is implemented as part of an application that can be executed on a user device. Data can be provided via user interface 406 that is received by gateway 402 and stored in event log 412. In one example, event log 412 can include data relating to a user's credit or bank transactions, browsing history, geolocation, spending habits, online transactions, etc. Event log 412 can be used to store data relating to any user event that is relevant to determining a real-time offer for the user. The data stored in event log 412 can be parsed, translated, deconstructed, assembled, or otherwise processed by export event process 430 for storage in user history 414.

Machine learning data flow 400 can further include data relating to models 416, such as the machine learning models discussed in connection with previous figures. Data relating to models 416 can be stored in dataset 418 and in prediction models 420. In some examples, the data in model dataset 418 can be populated by export history process 432. Dataset 418 can include user attribute data (e.g., user attributes 304), data relating to other users (e.g., other user data set 306), data relating to purchases (e.g., purchase attributes 308), data relating to offer attributes (e.g., offer attributes 310), data relating to policy rules (e.g., policy management 316), as well as any other input or data that can be used to train a machine learning algorithm.

In some implementations, machine learning data flow 400 can include training process 434 that can implement one or more machine learning algorithms on dataset 418 to formulate and train prediction models 420. Prediction models 420 can be used to derive real-time offers for users based on dataset 418. Prediction models 420 can be used to calculate one or more probabilities relating to real-time offers, such as probability of offer acceptance, probability of offer rejection, probability of making first payment, probability of compliance at half term, probability of compliance at full term, etc.

Machine learning data flow 400 can also include an administrator user interface 436 that can be implemented using an admin API 438. In some examples, the administrator user interface 436 can be used to configure or implement one or more rules 422. The data relating to rules 422 can be stored in templates 424 and in policy 426. In some examples, templates 424 can include a table or matrix of predefined offers (e.g., predefined offers 314) that can be implemented to assist artificial intelligence algorithms. In further examples, policy 426 can include one or more rules (e.g., policy management 316) set forth by a particular credit provider that can be used as a safeguard for offers generated by artificial intelligence module. In some implementations, data stored in templates 424 and policy 426 can also be provided as an input to dataset 418 and used to by training process 434 to further develop prediction models 420.

Figure 5:
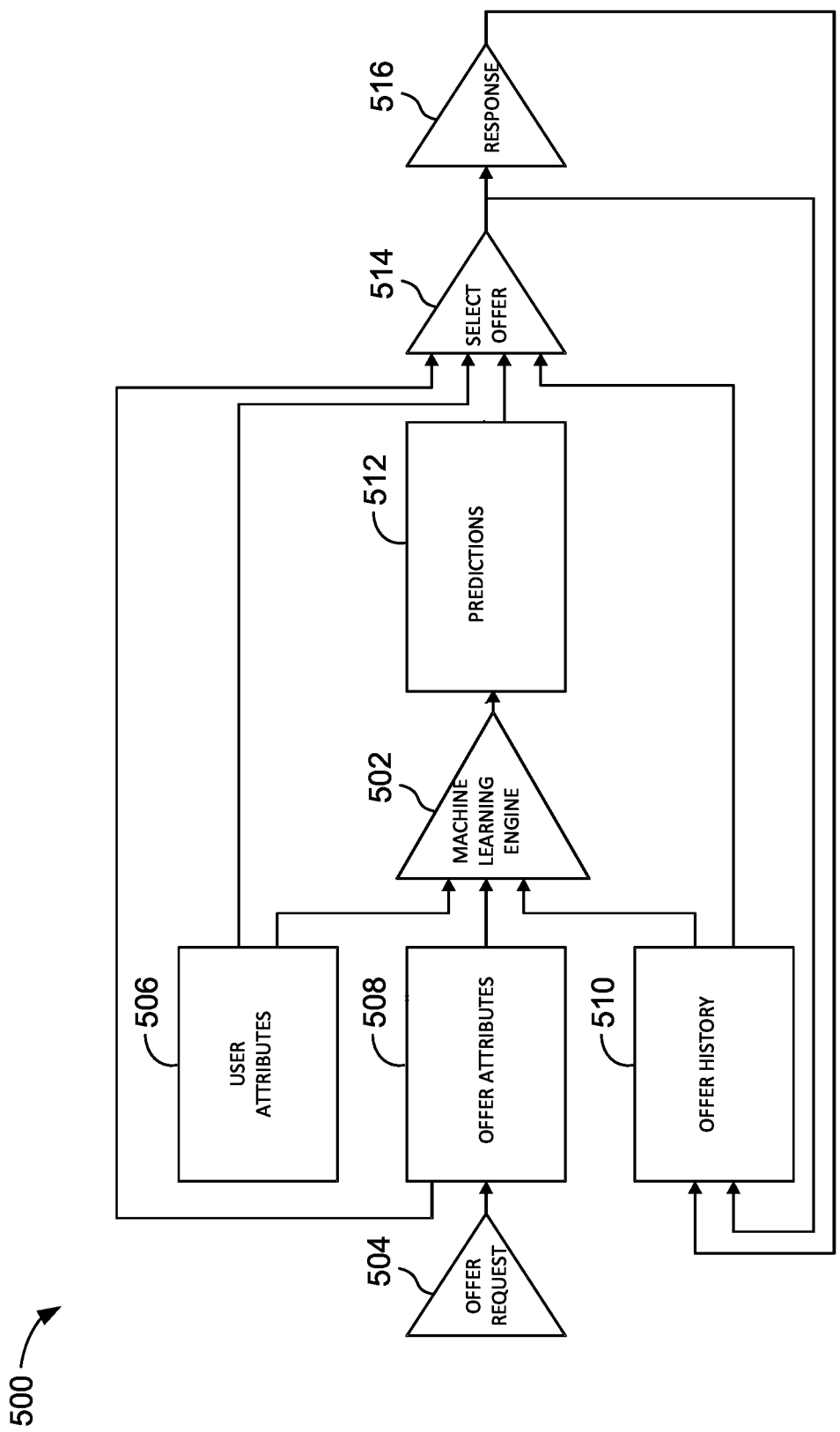
FIG. 5 illustrates an example of a flowchart of preparing a loan offer, in accordance with some examples.

FIG. 5 illustrates an example of a diagram for a real-time offer platform 500, in accordance with some examples. Real-time offer platform 500 can include machine learning engine 502 which can be configured to receive input relating to user attributes 506, offer attributes 508, and offer history 510. In some examples, user attributes 506 can include name, age, location, bank account data (e.g., institutions, types, balance, transactions, etc.), education, employment, occupation, income, demographics, digital wallet(s), credit score, loan/credit history (e.g., open loans/credit, loans paid off, late payments, etc.), browsing history, spending patterns, user preferences, dislikes, etc.

In some examples, offer attributes 508 can include attributes associated with offer request 504. For example, a user may utilize a real-time offers application to request an offer to make a purchase on Amazon™. The offer request 504 may include offer attributes 508 such as an amount requested, purchase information (e.g., goods, service, timeframe, etc.), merchant information, type of purchase, or any other attribute that can be associated with an offer. In other examples, offer attributes 508 can include additional offer attributes that are not associated with offer request 504, such as offer attributes 310.

Machine learning engine 502 can also receive input from offer history 510. Offer history 510 can include history related to individual users as well as sets of data associated with other users. The sets of data associated with other users can be used by machine learning engine 502 to derive sets of data for similarly situated users. In some examples, the data in offer history 510 can include data related to credit in use, loans requested, loans accepted, loans paid back, as well as any other related user attribute.

Machine learning engine 502 can use the data from user attributes 506, offer attributes 508, and offer history 510 to develop a model that can yield one or more predictions 512 with respect to a user having one or more user attributes as related to an offer having one or more offer attributes. For example, machine learning engine 502 can predict or calculate a probability that the user will accept or decline an offer, a probability that a user will make a first payment on time, a probability that a user will be up to date with payments at half term, a probability that a user will be up to date with payments at full term, or any other probability associated with a real-time offer.

Upon receiving the one or more predictions 512, real-time offer platform 500 can select an offer at 514. The selection of an offer can be made according to a policy that can include rules and/or predefined offers that are set forth by a particular lender. The policy can include criteria relating to user attributes as well as the probabilities or predictions 512 that can be used to select an offer. In some implementations, policy and/or rules can be provided as inputs to machine learning engine 502 which can also make the offer selection 514 by utilizing artificial intelligence techniques. Alternatively, or in addition to the foregoing, the offer selected according to the policy can be provided as an input to machine learning engine 502.

A selected offer may be presented to a user (e.g., via a device application) and the user can provide a response 516 indicating acceptance or rejection of the offer. The user's response can be used to update one or more data sets that are stored as part of offer history 510. In doing so, machine learning engine 502 can enhance its algorithm by reinforcement (e.g., user accepts) or by further training (e.g., deriving new offer with different variables). The feedback mechanism in real-time offer platform 500 can be used to continuously enhance and update offer history 510 such that machine learning engine 502 can derive new data sets for similarly situated users in a dynamic manner.

Figure 6:
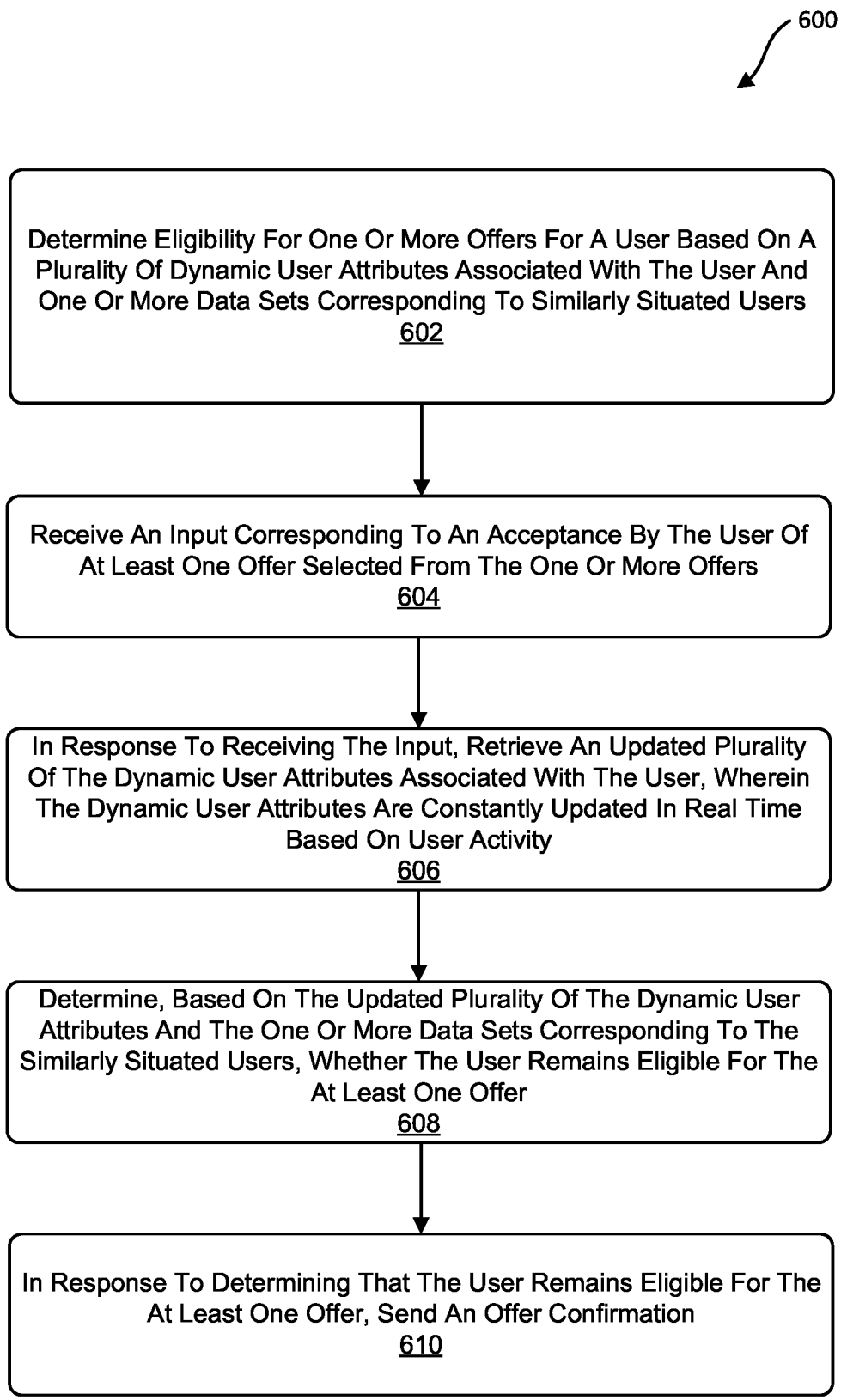
FIG. 6 illustrates an example of flowchart of preparing a real-time offer, in accordance with some examples.

FIG. 6 is a flow diagram illustrating an example of a process 600 for deriving real-time offers, in accordance with some examples. At operation 602, the process 600 includes determining eligibility for one or more offers for a user based on a plurality of dynamic user attributes associated with the user and one or more data sets corresponding to similarly situated users. The plurality of dynamic user attributes can include attributes such as age, location, bank account data (e.g., institutions, types, balance, transactions, etc.), education, employment, occupation, income, demographics, digital wallet(s), credit score, loan/credit history (e.g., open loans/credit, loans paid off, late payments, etc.), browsing history, spending patterns, user preferences, dislikes, etc.

In some implementations, the one or more data sets corresponding to similarly situated users can be derived from data associated with groups of other users (e.g., historical user data compiled by a lender). A machine learning algorithm can be used to identify the one or more data sets corresponding to similarly situated users from data sets of other users that can include users that are not similarly situated. The machine learning algorithm can further be used to determine a user's eligibility for the one or more offers. In some implementations, the machine learning algorithm can determine one or more probabilities associated with the offer (e.g., probability of acceptance, probability of repayment, etc.) and the determination of eligibility for an offer can be further based on the probabilities.

In one example, dynamic user attributes can be used to derive one or more offers for a user that does not have any credit cards or credit history. For instance, similarly situated users (e.g., no credit card or credit history) can be identified that have successfully complied with prior offers in order to derive the terms for real-time offer for the user.

At operation 604, the process 600 includes receiving an input corresponding to an acceptance by the user of at least one offer selected from the one or more offers. In some implementations, the input can be received from a user application that is executing on a user device. In other examples, an offer can be presented that has a range associated with one or more offer attributes, and the input can further include the user's selection for the variables. In some examples, the input may correspond to a user's rejection of the one or more offers, which may in turn trigger the process to derive a new offer for the user.

At operation 606, the process 600 includes retrieving an updated plurality of the dynamic user attributes associated with the user in response to receiving the input, wherein the dynamic user attributes are constantly updated in real time based on user activity. The updated plurality of the dynamic user attributes can be retrieved by utilizing one or more services 230 and/or by accessing one or more third-parties that are associated with the user by providing user credentials or by utilizing a federated environment. In some implementations, the process can include a threshold timeframe for accepting and offer. Receiving an input indicating acceptance after the threshold timeframe may trigger retrieval of the updated dynamic user attributes.

At operation 608, the process 600 includes determining, based on the updated plurality of the dynamic user attributes and the one or more data sets corresponding to the similarly situated users, whether the user remains eligible for the at least one offer. For example, a user may have made a large purchase after the offer was initially presented that caused the user's account balance to drop below a threshold that is required to qualify for the offer. In this instance, the updated plurality of dynamic user attributes would reveal the change in the attributes that may result in disqualification for the offer. In some implementations, if the user no longer qualifies for a prior offer, a new offer can be derived and presented based on the updated user attributes (e.g., by using machine learning algorithms).

At operation 610, the process 600 includes sending an offer confirmation in response to determining that the user remains eligible for the at least one offer. An offer confirmation can include data and/or instructions for the user to utilize the offer. For example, a link to a digital card, an update to user's digital wallet, confirmation of a mailing of a physical credit card, etc.

Figure 7A:
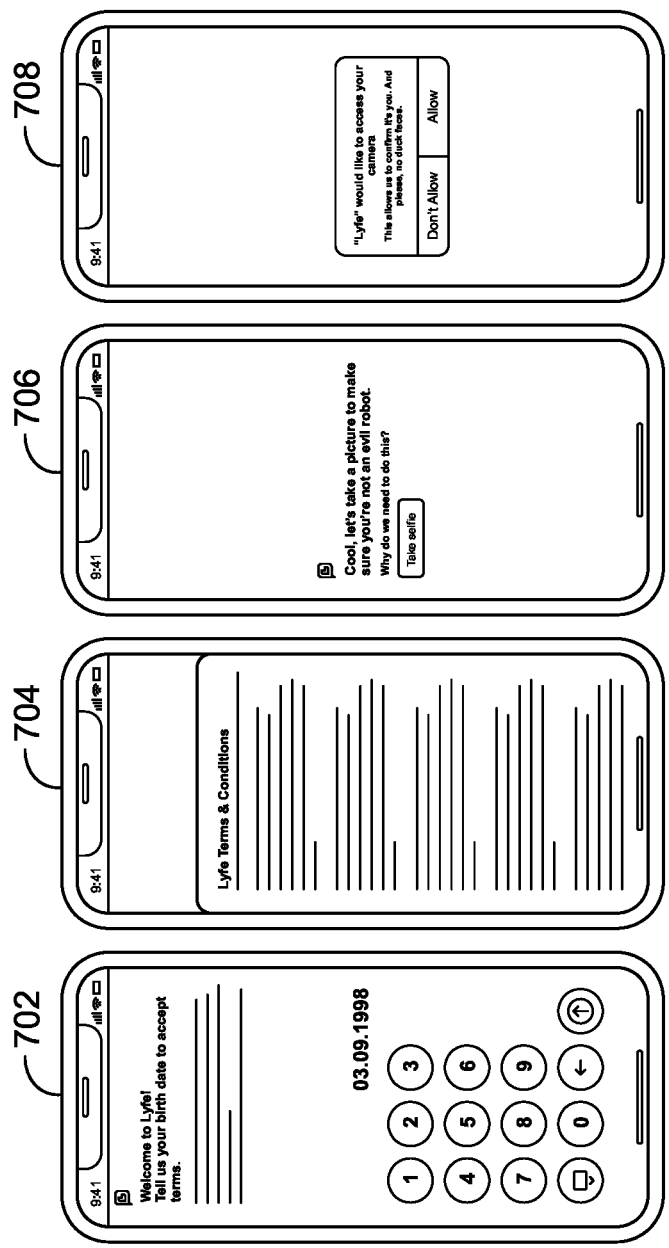
FIGS. 7A-7C illustrate an example of registering a user account, in accordance with some examples.
Figure 7B:
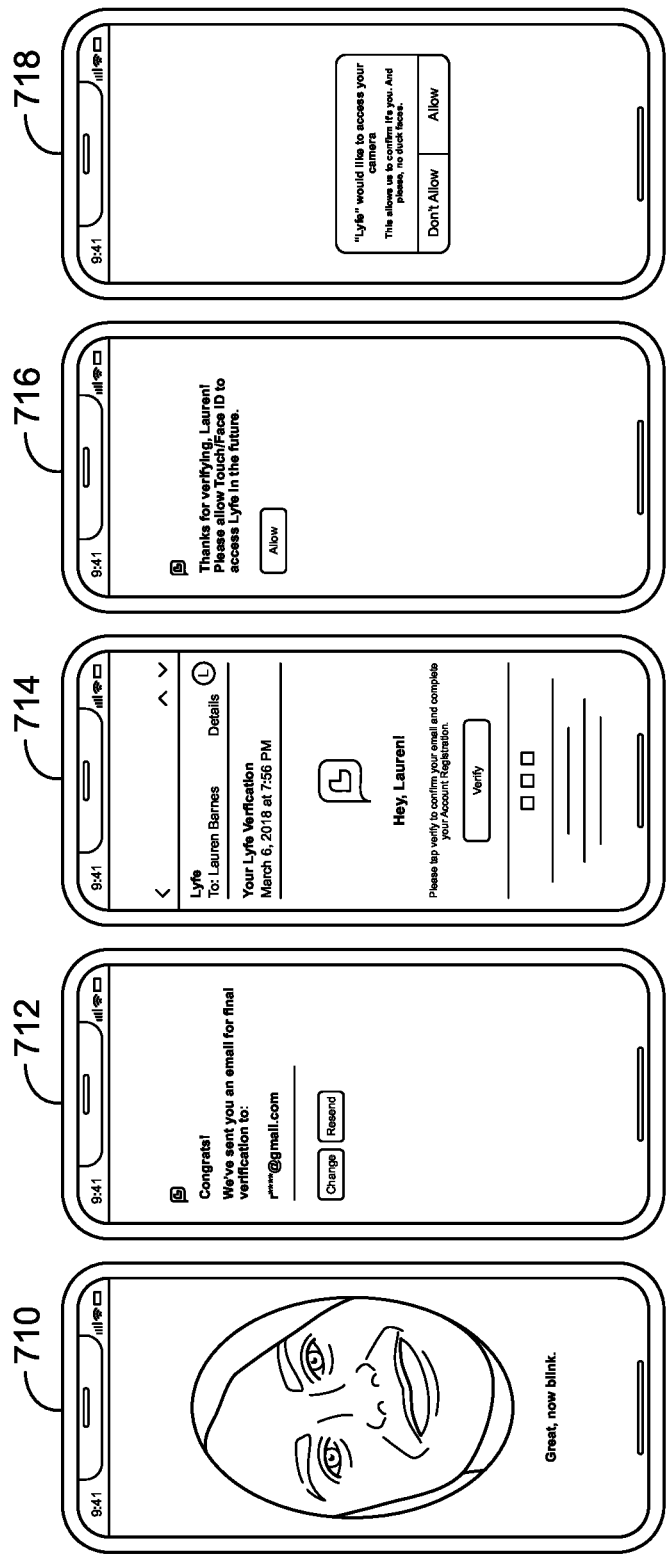
Figure 7C:
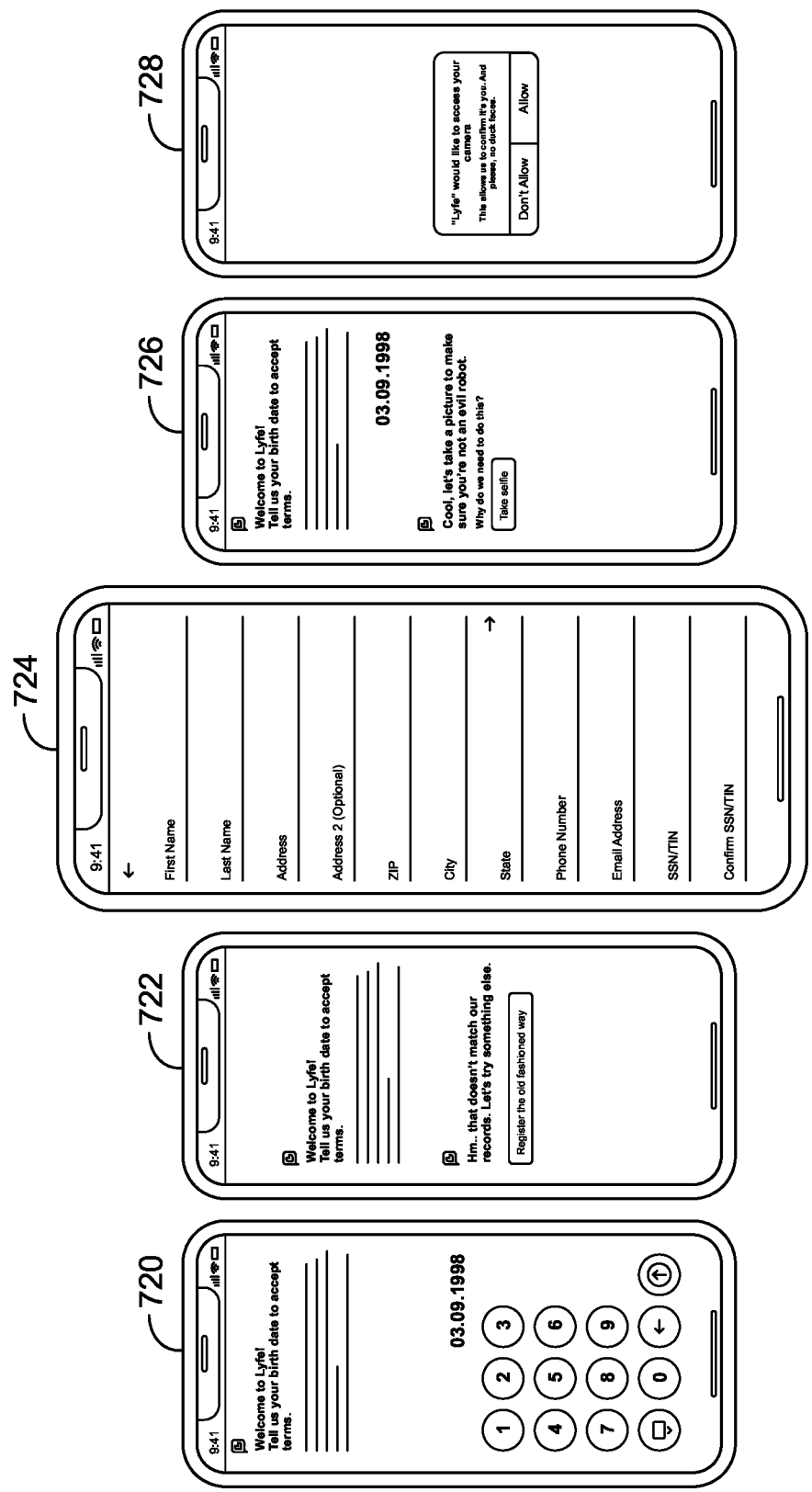

FIGS. 7A-7C illustrate an example of registering a user account, in accordance with some examples. Registration of the user account can include obtaining personal information of the user (e.g., name, birthdate, email address, and social security number), as illustrated in sample screen capture 724. Registration of the user account can also include reading and accepting terms and conditions (704), obtaining a selfie picture to confirm identity at a current/future time (726), allowing phone capabilities, or any other information suitable for the intended purpose and understood by a person of ordinary skill in the art. Portions of the registration process can be automated or manually received from the user.

Figure 8A:
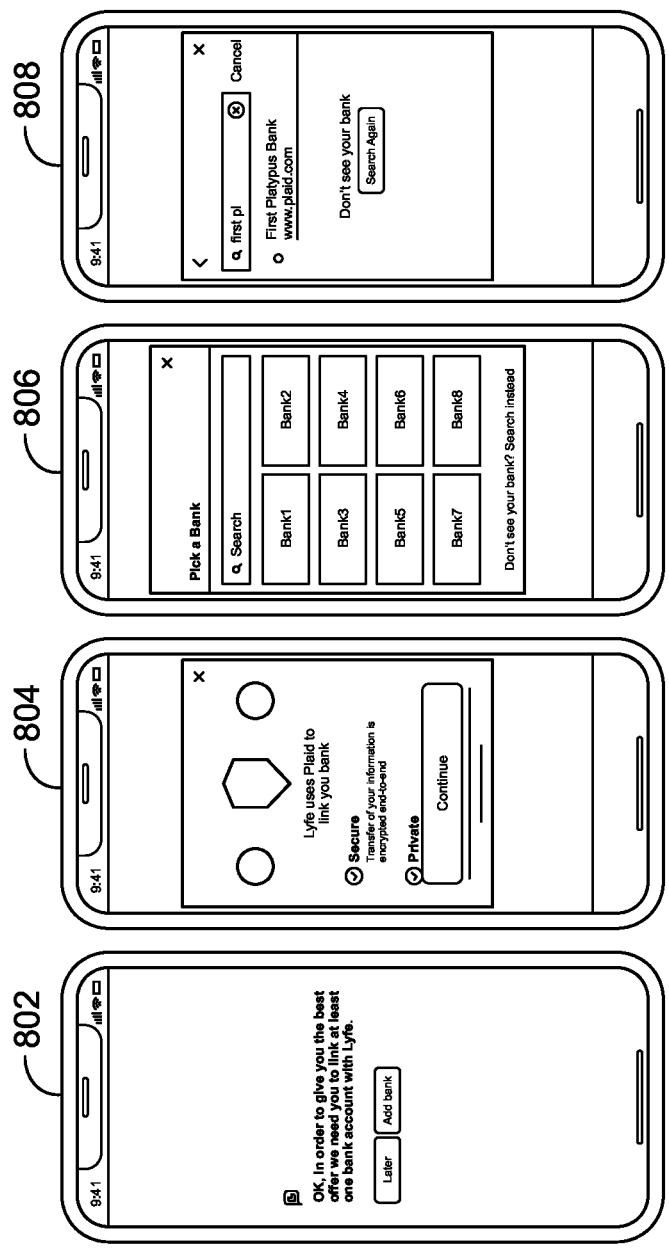
FIGS. 8A and 8B illustrate an example of adding a bank account, in accordance with some examples.
Figure 8B:
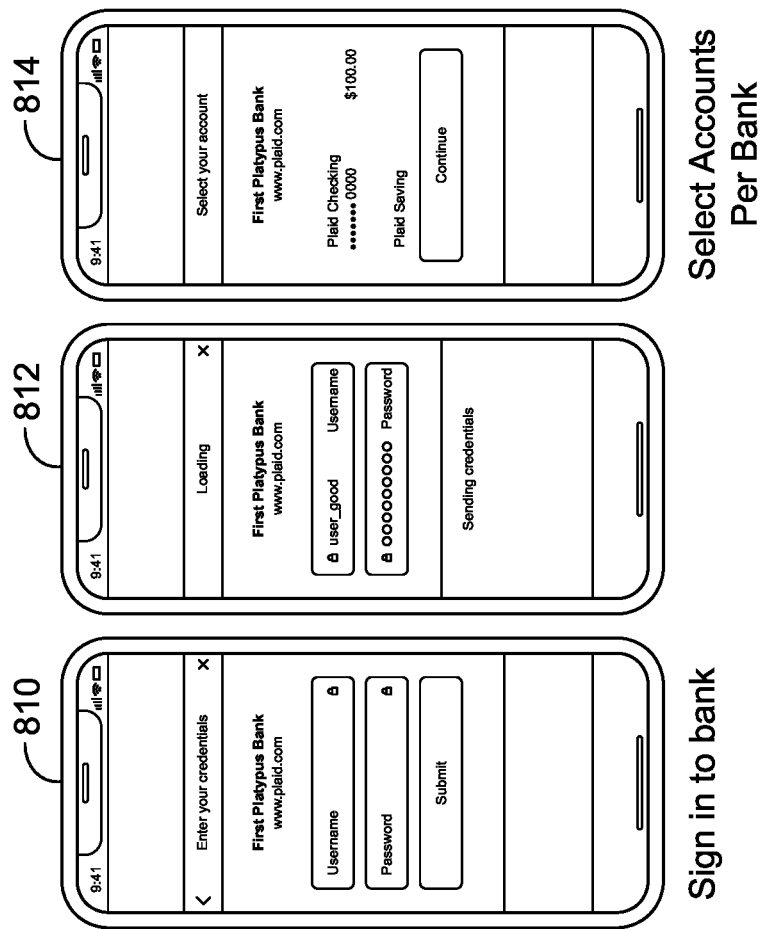

FIGS. 8A and 8B illustrate an example of adding a bank account, in accordance with some examples. The real-time offer system provides a user the ability to add their bank account information to facilitate future transactions. Example financial institutions can be provided or bank information can be searched by key terms. Once a financial institute is selected, the user can provide their login credentials to link their bank account with the real-time offer system so that the bank account is easily accessible for future transactions.

Figure 9:
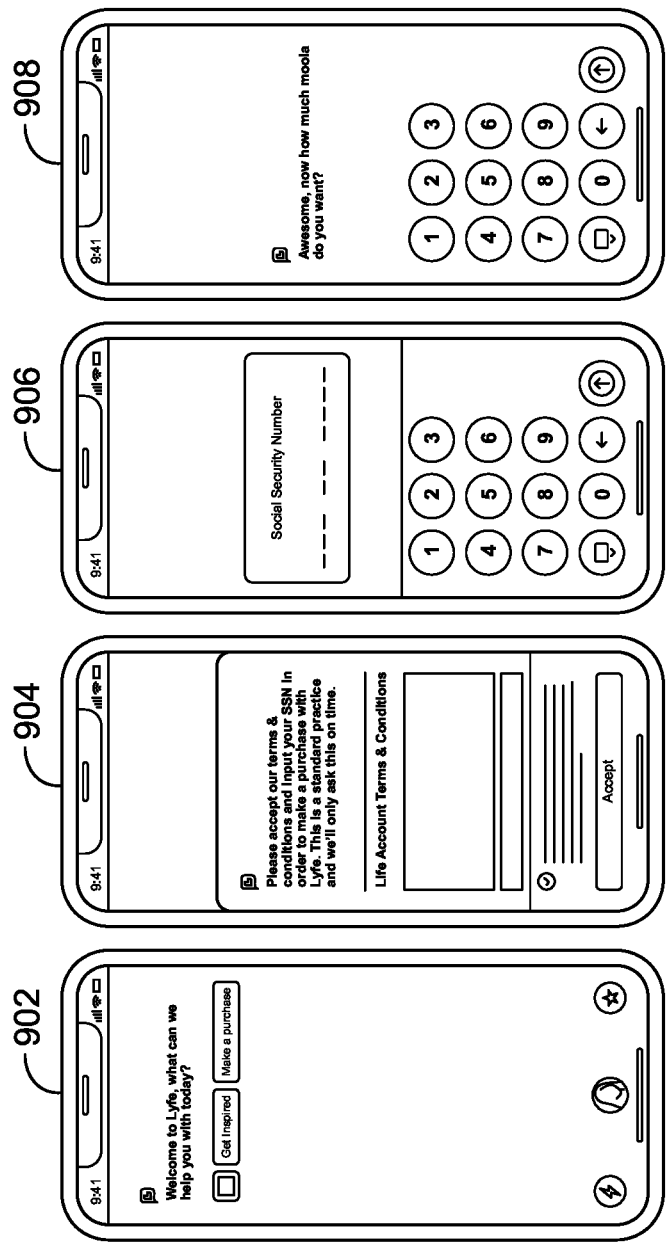
FIG. 9 illustrates an example of applying to the loan transaction system of FIG. 1, in accordance with some examples.

FIG. 9 illustrates an example of applying to the real-time offer system of FIG. 1, in accordance with some examples.

The loan transaction system can initiate a transaction by providing recommendations of purchases or by allowing the user to provide the loan transaction system with particulars of an item to purchase. Terms and conditions can be provided to the user so that the user is fully informed of any obligation associated with a completed loan transaction. Confirmation of acceptance of the terms and conditions can be performed by the user by providing their social security number.

Figure 10:
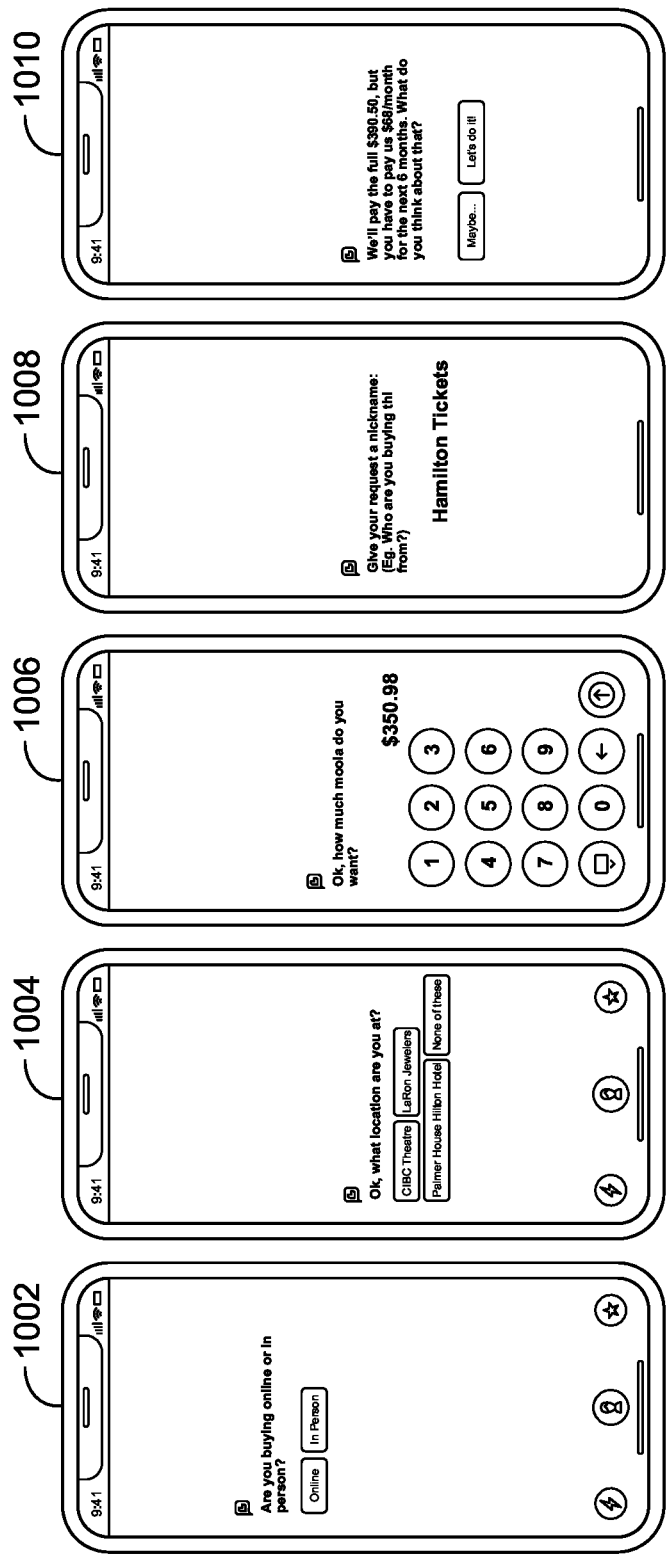
FIG. 10 illustrates an example of a real-time offer process, in accordance with some examples.

FIG. 10 illustrates an example of a real-time offer process, in accordance with some examples. The real-time offer process can include inquiring whether the future purchase of the item (for which the offer will be used) will be in-person or online. If the purchase of the item is in-person, the user can then be asked their location (potential locations such as venues can also be provided to the user by utilizing their geographic position). The user can then be asked how much they want to borrow in order to purchase the item. Nicknames can be provided to associate the loan with a specific purchase. Once the particulars of the purchase have been provided, the real-time offer process can provide terms of the offer including a monthly amount and for how many months/years.

Figure 11:
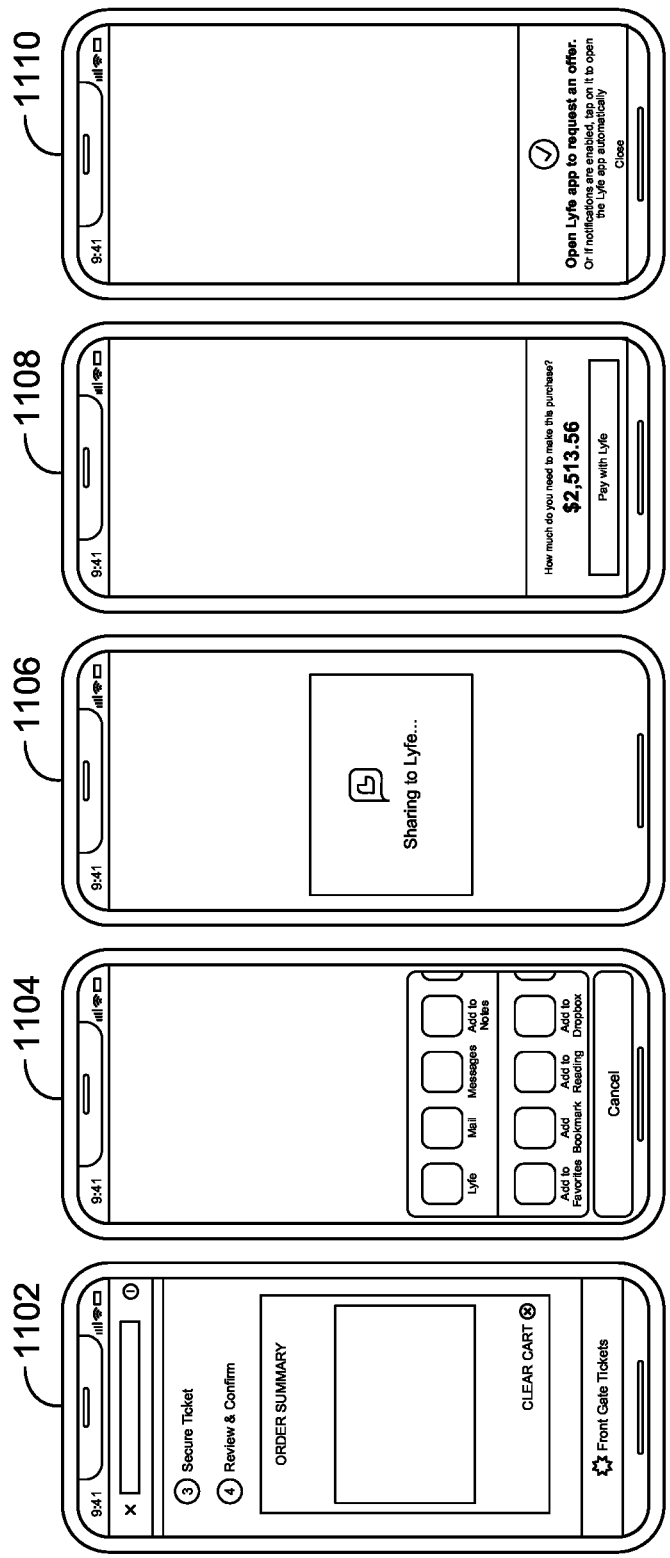
FIG. 11 illustrates an example of sharing information between a web browser and an application, in accordance with some examples.

FIG. 11 illustrates an example of sharing information between a web browser and a real-time offers application, in accordance with some examples. For example, as a user browses the internet, the user may want to purchase a concert ticket. In this case, the website that includes the particulars of the concert ticket (e.g., price, quantity, and date) can be ported over to the real-time offers application so that the above-described real-time offer process can begin.

Figure 12:
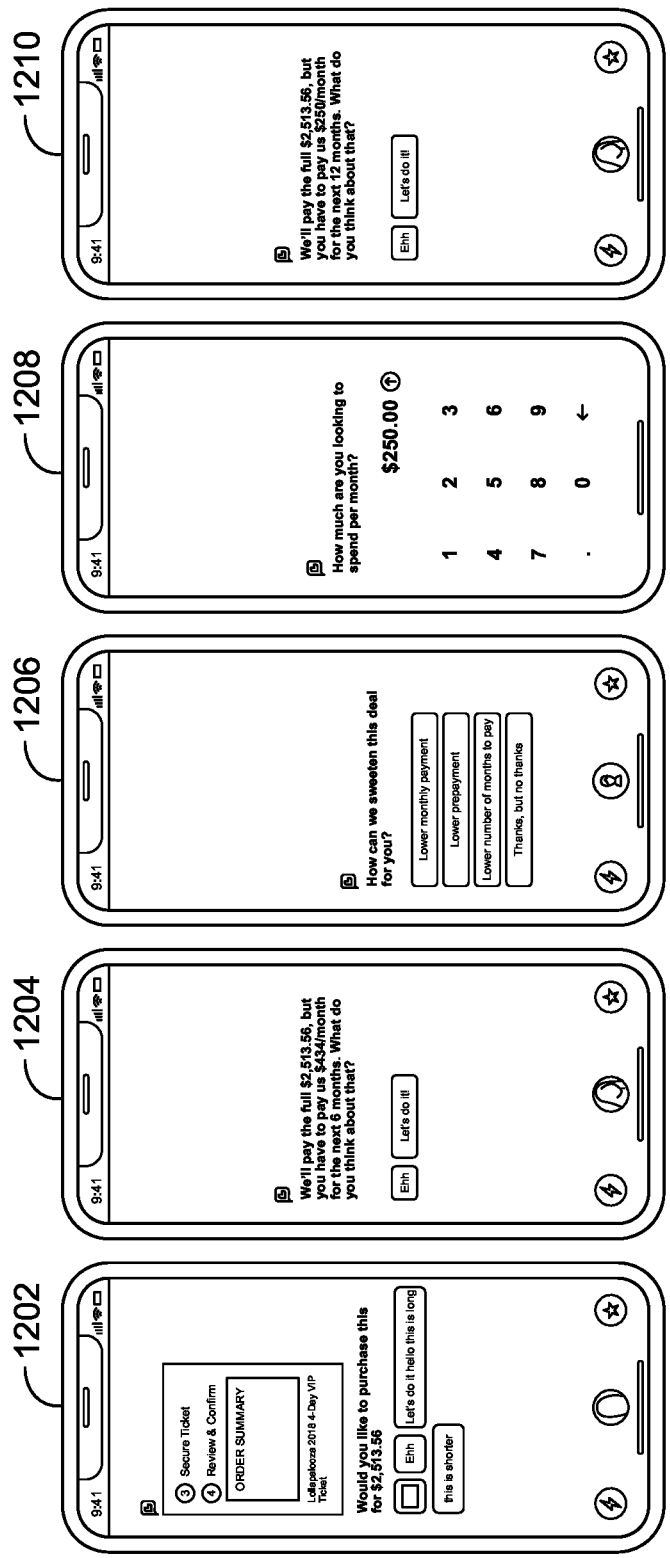
FIG. 12 illustrates another example of an offer process, in accordance with some examples.

FIG. 12 illustrates another example of a real-time offer process, in accordance with some examples. In some cases, after an initial offer is provided to the user, the real-time offer system can provide the user with additional options to revise the terms and conditions of the offer. For example, the additional options can include a lower monthly payment, a lower prepayment (i.e., deposit), a lower number of months to pay, or any other option suitable for the intended purpose and understood by a person of ordinary skill in the art.

After an option for different terms is selected by the user, the user can provide additional information of how they would like the terms to be changed. For example, if the lower monthly payment option is selected, the user can input the amount of money they would like to pay every month. Thereafter, the offer system can provide revised terms that correspond to the user input. In the example where the user selected a monthly amount of $250, (1208) the number of months of payment may be adjusted from 6 months to 12 months (see 1210). The process of providing the user with options to adjust the terms of the offer can continue indefinitely until the user is satisfied with the terms of the loan.

Figure 13:
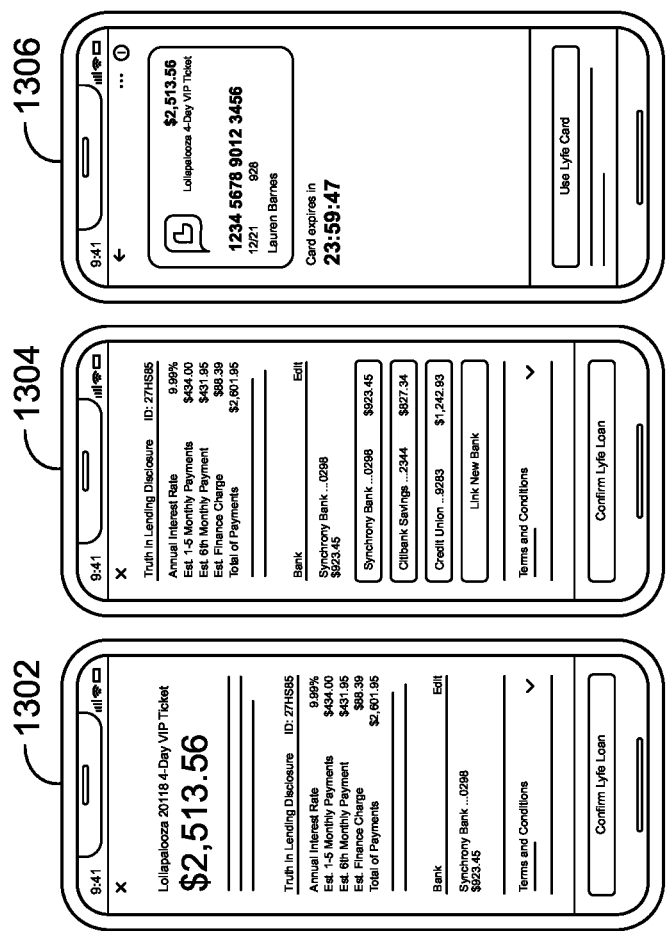
FIG. 13 illustrates an example of an offer acknowledgement, in accordance with some examples.

FIG. 13 illustrates an example of an offer acknowledgement, in accordance with some examples. The offer acknowledgement can include the particulars of the offer to be confirmed by the user. Once the user is satisfied with the offer terms, the user can complete the transaction by selecting a method of payment for the offer. Thereafter, the real-time offer system can provide the user with a digital credit/debit card to purchase the item. The digital card allows the user to purchase the item without having to provide their personal credit card information, thereby minimizing opportunities of identity theft.

Figure 14:
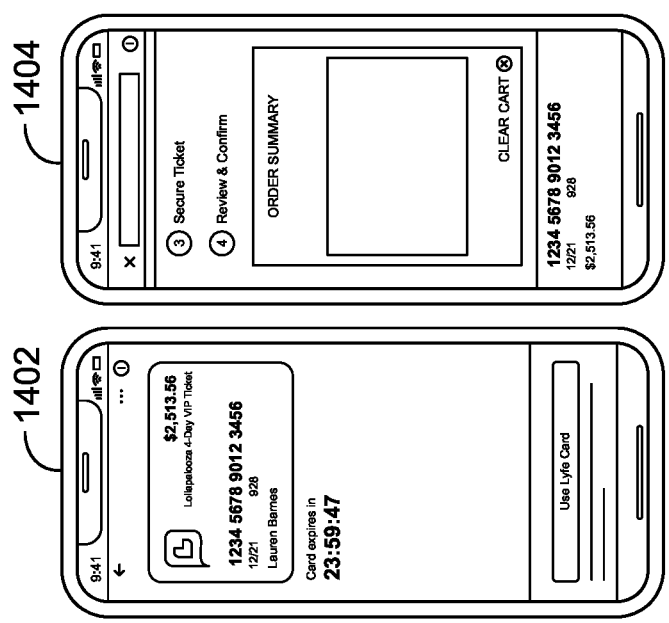
FIG. 14 illustrates an example of a digital online credit card, in accordance with some examples.

FIG. 14 illustrates an example of a real-time offers application online credit card (1402), in accordance with some examples. The real-time offers application online card can then be used to purchase the item (e.g., concert ticket) at the venue's website. The digital card information can also be shared/ported from the offer application to the venue's website to provide the user with a smooth and seamless transaction.

Figure 15A:
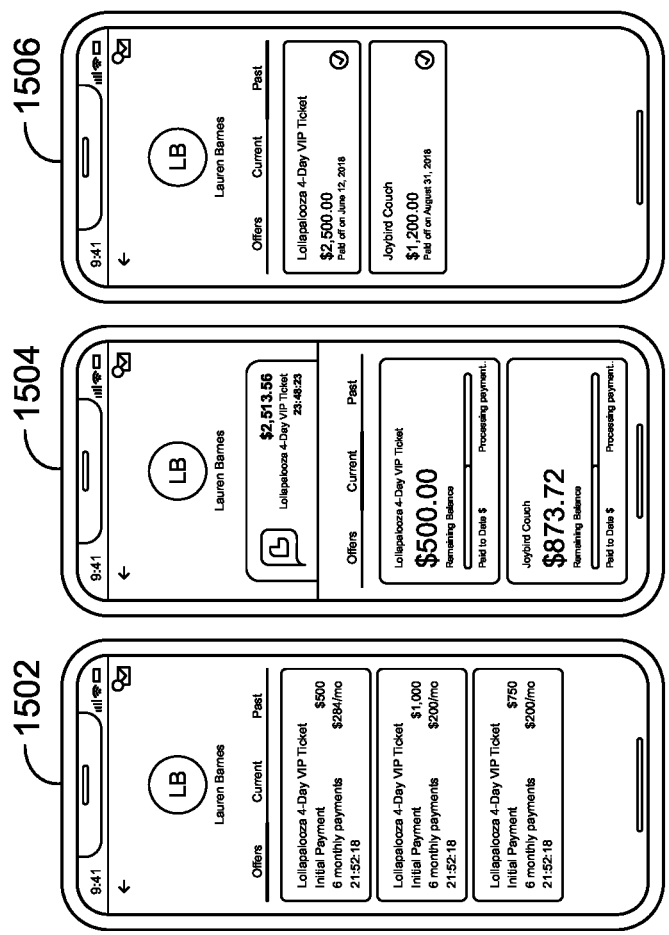
Figure 15B:
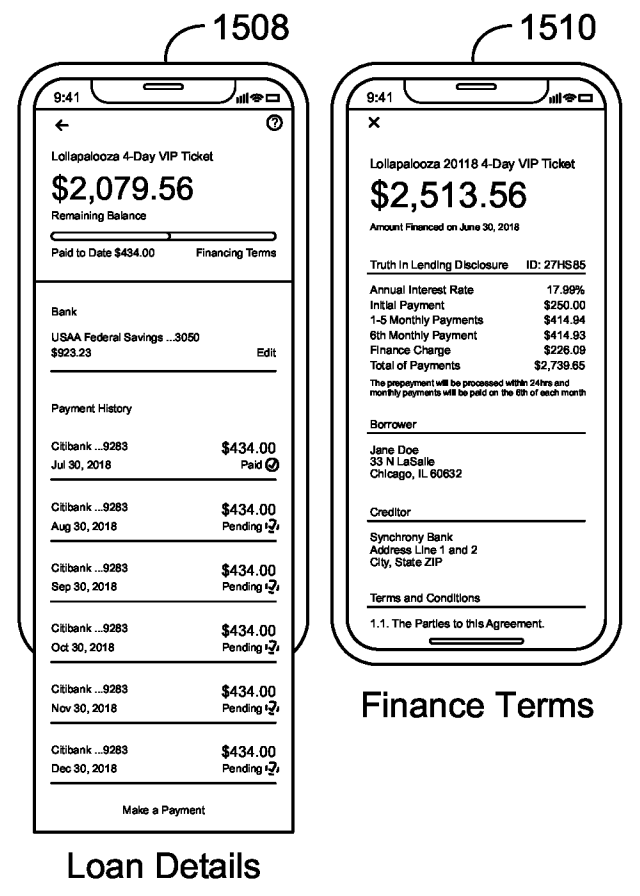
Figure 16:
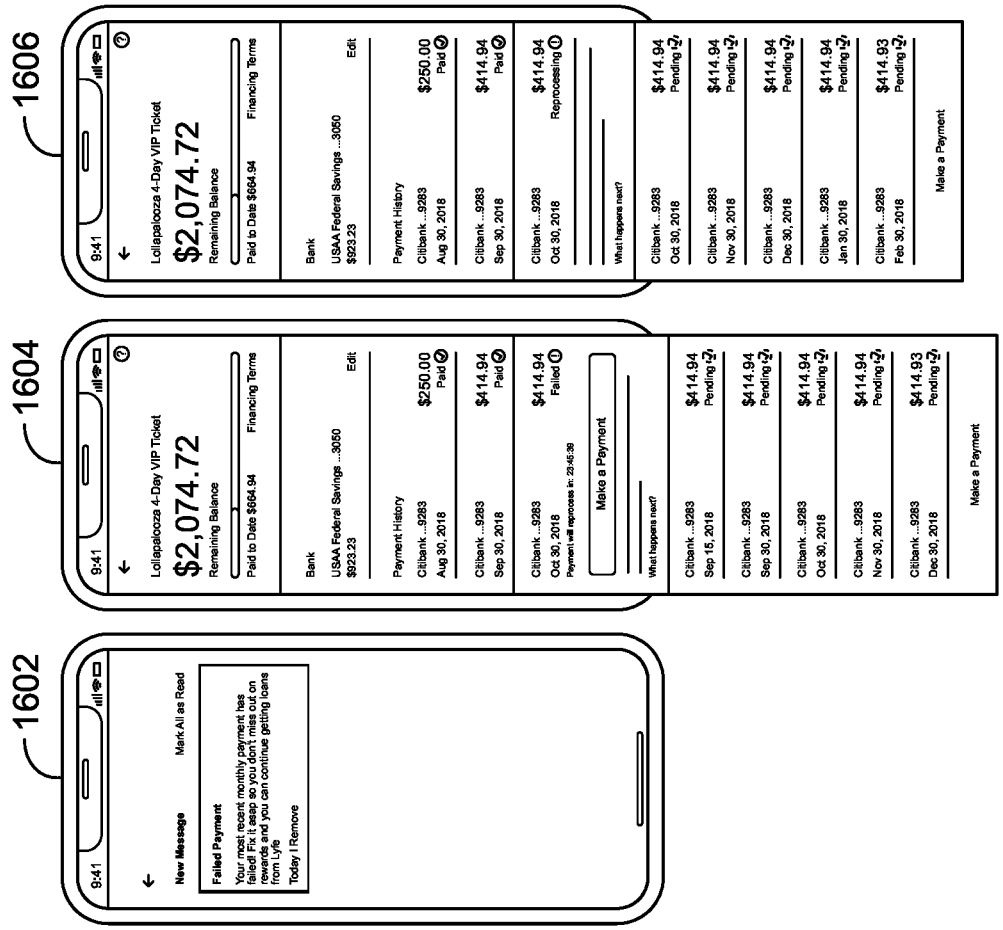
FIG. 16 illustrates an example of a offer management process including a failed payment, in accordance with some examples.

FIGS. 15A and 15B illustrate an example of an offer management process, in accordance with some examples. The real-time offer system can also provide the user with the ability to view current offers, current loans, and past loans within the offer application. The offer management system also can provide the user with the ability to view future payments on a particular offer and a summary of the offer including an interest rate, initial payment, monthly payments, finance charges, total payments, personal information, financial information, terms and conditions, or any other information suitable for the intended purpose and understood by a person of ordinary skill in the art FIG. 16 illustrates an example of an offer management process including a failed payment, in accordance with some examples. As illustrated in screen capture 1602, an application may alert the user of the failed payment. Screenshots 1604 and 1605 illustrate the history of the payments for the associated offer, in which a user may reattempt the failed payment.

Figure 17:
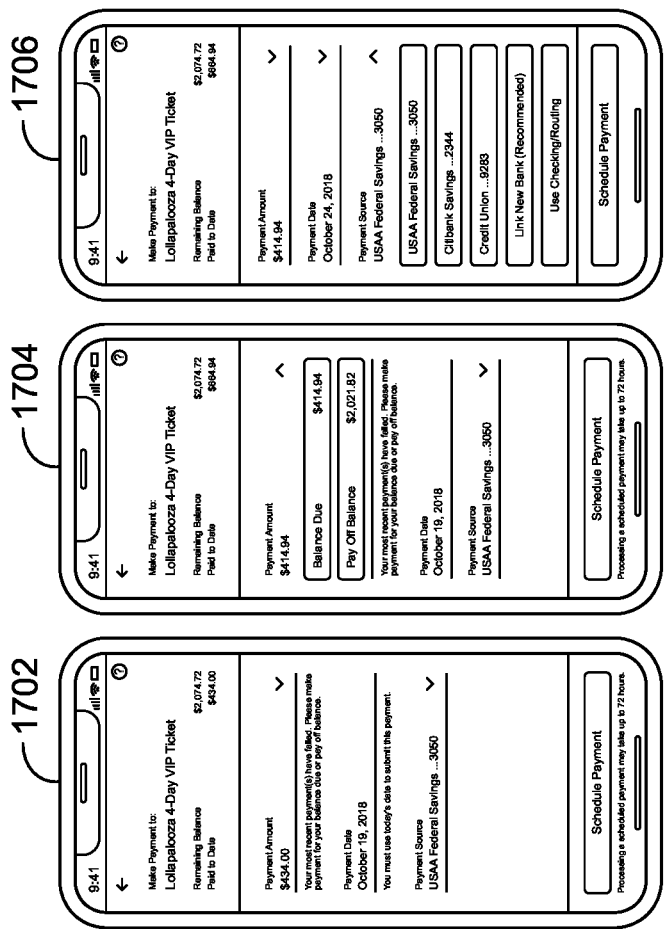
FIG. 17 illustrates an example of a payment process, in accordance with some examples.

FIG. 17 illustrates an example of a payment process, in accordance with some examples. In some cases, a payment may fail for any given reason. In this case, the offer system as described herein can begin a reprocessing process where the user is notified of the failure and requested to attempt repayment of the failed payment. The repayment can be paid with the previously utilized bank account or a new bank account.

The process of utilizing a different method of payment (i.e., bank account) also can be utilized for regular payment of the monthly amount. For example, if a user has to close a credit card due to fraudulent activity, the user can initiate the payment process as shown in 1704 and 1705, in order to select another account to continue making the monthly payments.

Figure 18:
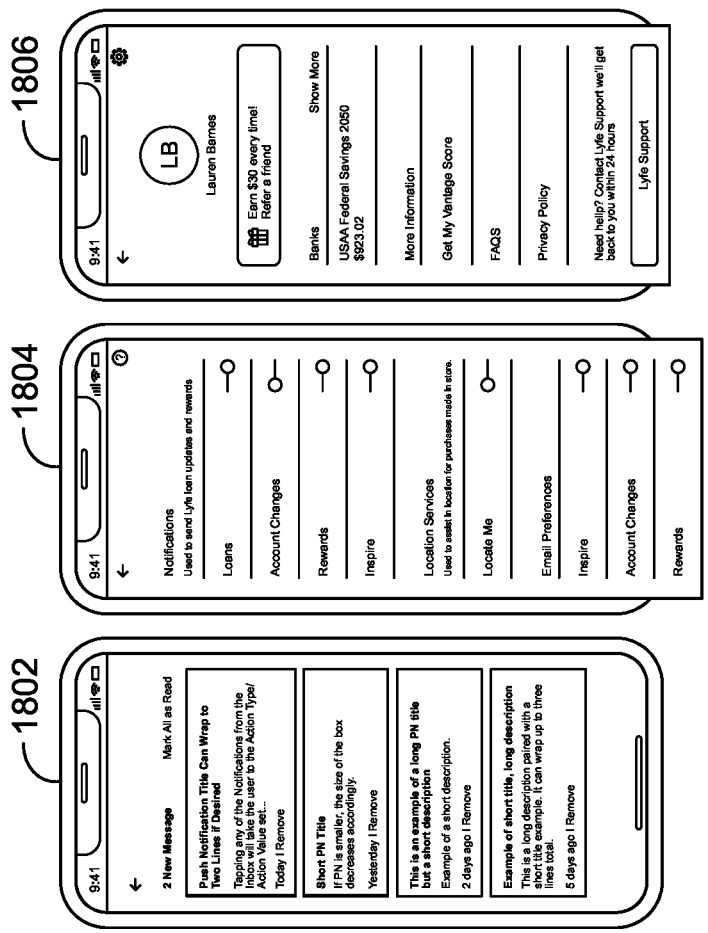
FIG. 18 illustrates an example of an account management process, in accordance with some examples.

FIG. 18 illustrates an example of an account management process, in accordance with some examples. The account management process can include providing messages to the user regarding the account and providing menu items to adjust certain aspects of the account such as notifications, locations services, and email preferences. The notifications can include loans, account changes, rewards, and recommendations. The email preferences can include recommendations, account changes, and rewards.

Figure 19:
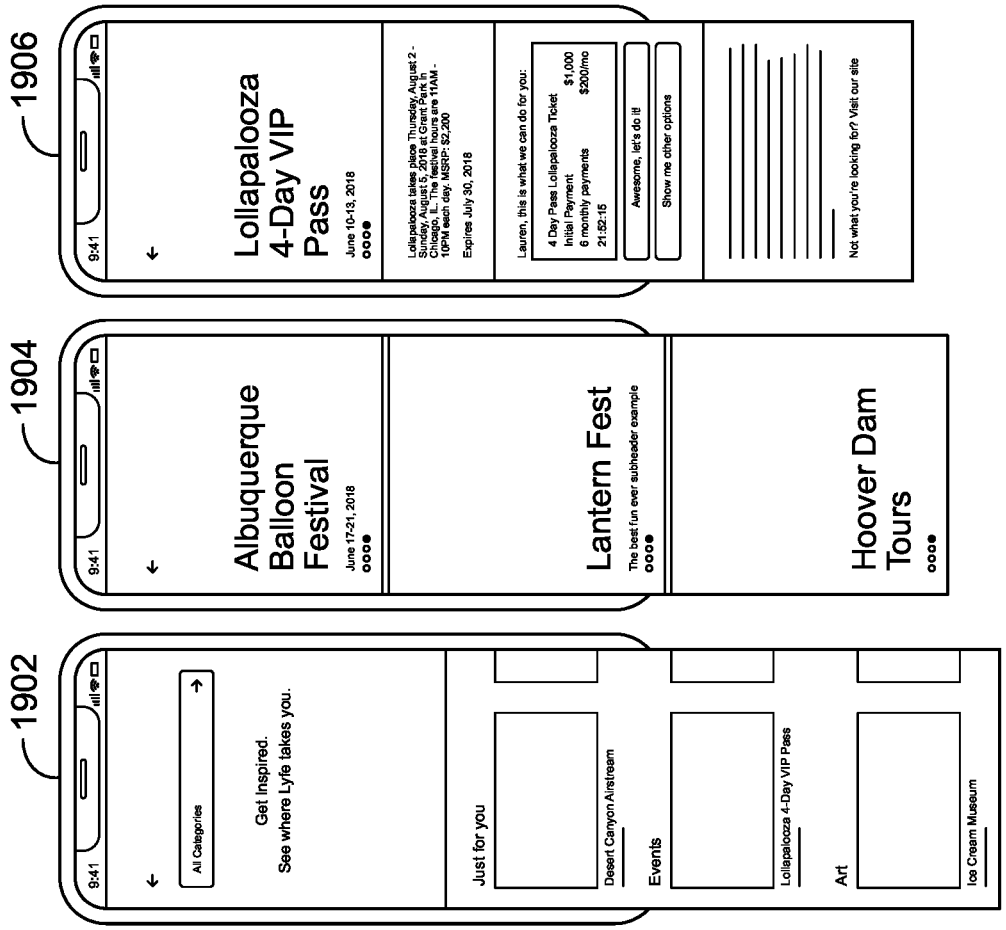
FIG. 19 illustrates an example of events provided by the loan transaction system of FIG. 1, in accordance with some examples.

FIG. 19 illustrates an example of events provided by the system of FIG. 1, in accordance with some examples. In some cases, the offer system can provide the user with suggestions or recommendations to events and items to purchase. The suggestions can be based on the user's location (i.e., events within a close proximity of the user), past attended/purchased events (e.g., concerts with similar genre), browser history, or any other information suitable for the intended purpose and understood by a person of ordinary skill in the art. Generating of the suggestions can be similar to the generating of the real-time offers as described herein, in that, past information and selections by the user can be utilized to provide the user with relevant events and items that the user is actually interested in attending and purchasing.

Figure 20:
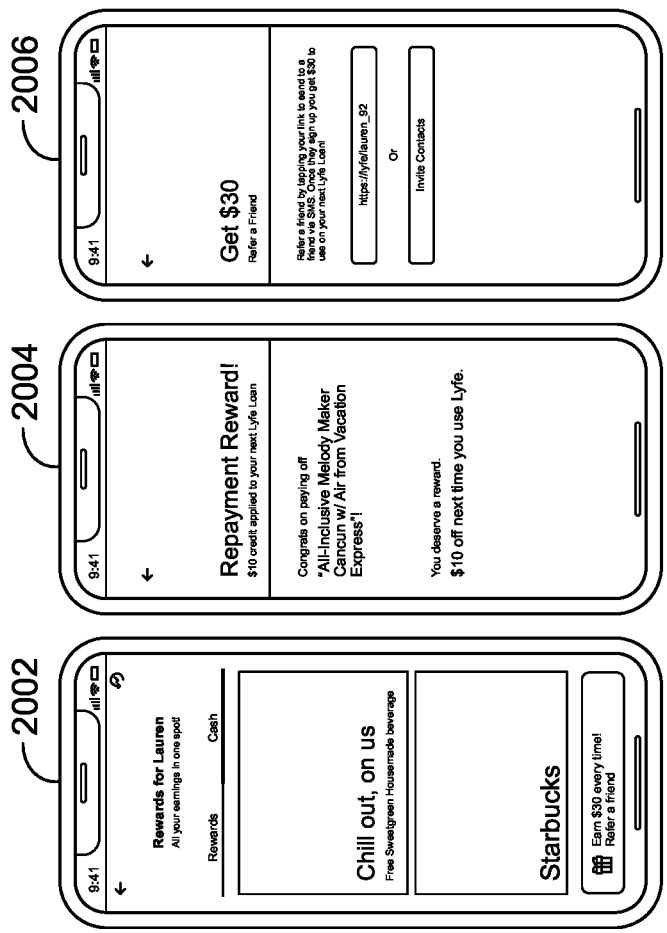
FIG. 20 illustrates an example of rewards provided by the offer transaction system of FIG. 1, in accordance with some examples.
Figure 21:
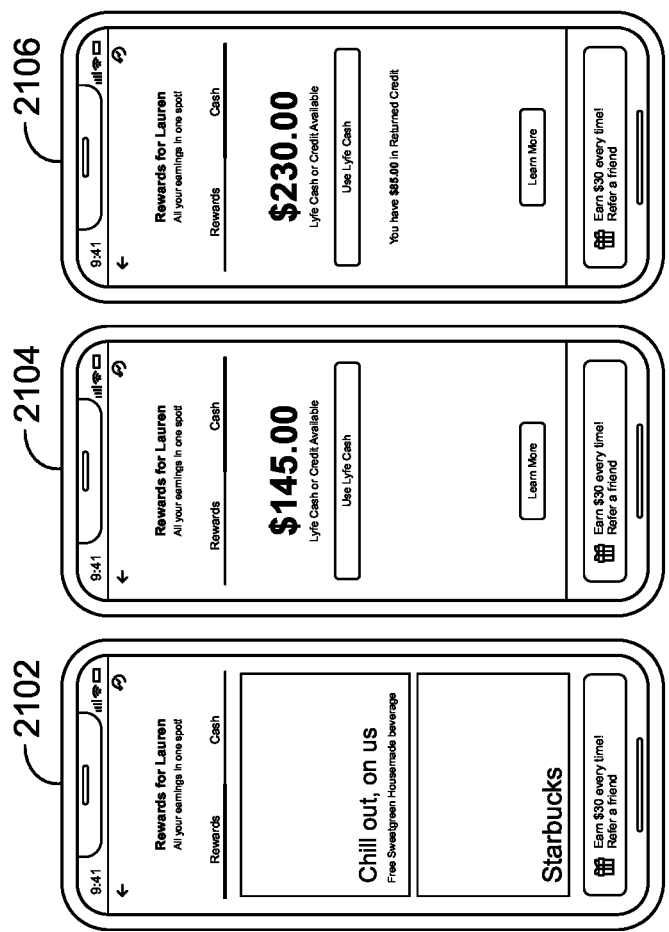
FIG. 21 illustrates an example of returns and digital rewards provided by the offer transaction system of FIG. 1, in accordance with some examples.

FIG. 20 illustrates an example of rewards provided by the offer transaction system of FIG. 1, in accordance with some examples. FIG. 21 illustrates an example of returns and offer "cash" provided by the offer transaction system of FIG. 1, in accordance with some examples. In some cases, the user can be rewarded for repayment of the offer/loan, for browsing through the suggestions of the offer system, for purchasing a suggested event/item, or any other action suitable for the intended purpose and understood by a person of ordinary skill in the art. After it is determined that a reward is to be provided to the user, the loan system can provide an initial reward. Thereafter, reward options can be provided to the user similar to how the user can be provided with different options regarding loan payment amount, term, and interest.

Figure 22:
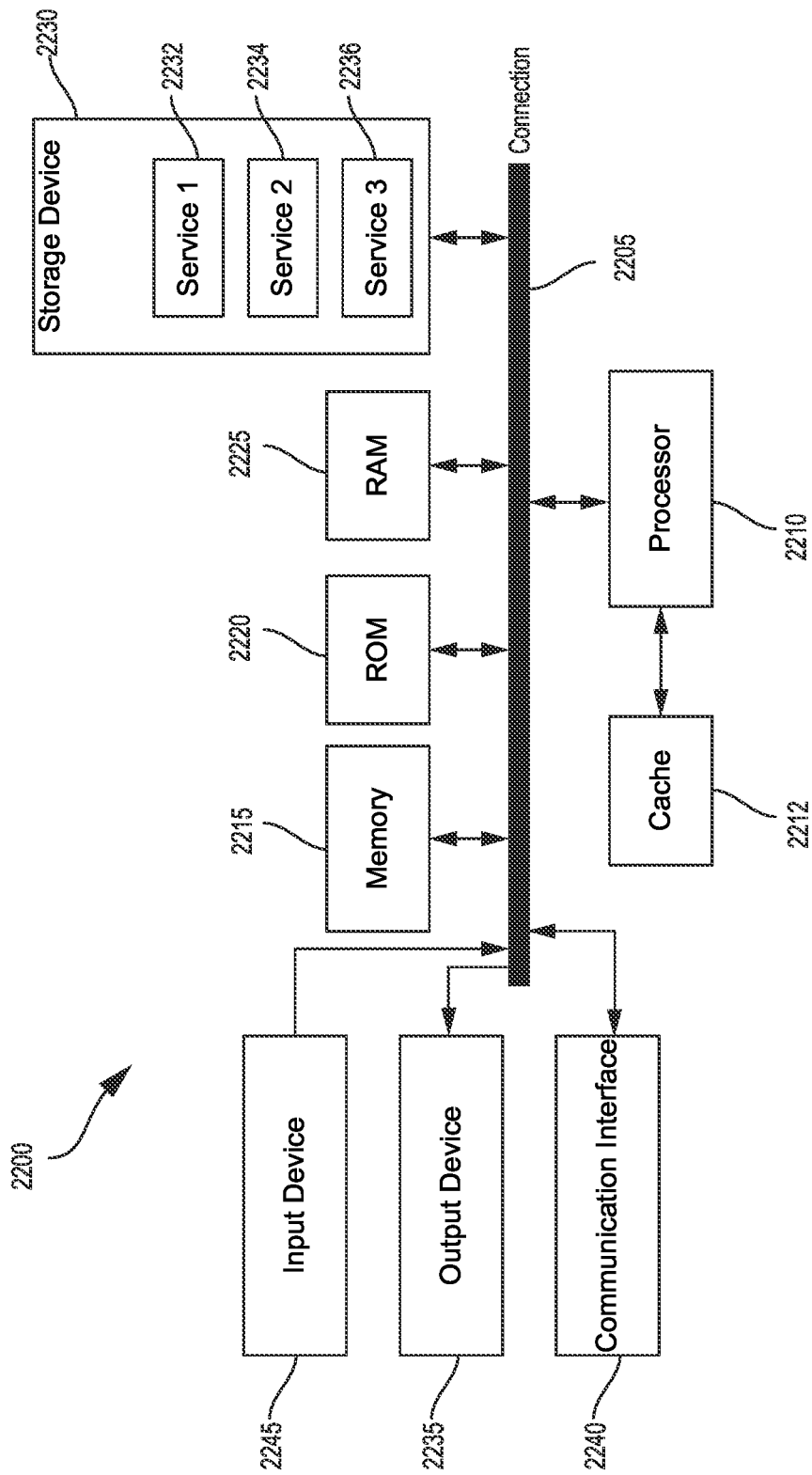
FIG. 22 illustrates a computing system architecture in accordance with some examples.

FIG. 22 illustrates a computing system architecture 2200 including various components in electrical communication with each other using a connection 2205, such as a bus, in accordance with some implementations. Example system architecture 2200 includes a processing unit (CPU or processor) 2210 and a system connection 2205 that couples various system components including the system memory 2215, such as ROM 2220 and RAM 2225, to the processor 2210. The system architecture 2200 can include a cache 2212 of high-speed memory connected directly with, in close proximity to, or integrated as part of the processor 2210. The system architecture 2200 can copy data from the memory 2215 and/or the storage device 2230 to the cache 2212 for quick access by the processor 2210. In this way, the cache can provide a performance boost that avoids processor 2210 delays while waiting for data. These and other modules can control or be configured to control the processor 2210 to perform various actions.

Other system memory 2215 may be available for use as well. The memory 2215 can include multiple different types of memory with different performance characteristics. The processor 2210 can include any general purpose processor and a hardware or software service, such as service 1 2232, service 2 2234, and service 3 2236 stored in storage device 2230, configured to control the processor 2210 as well as a special-purpose processor where software instructions are incorporated into the actual processor design. The processor 2210 may be a completely self-contained computing system, containing multiple cores or processors, a bus, memory controller, cache, etc. A multi-core processor may be symmetric or asymmetric.

To enable user interaction with the computing system architecture 2200, an input device 2245 can represent any number of input mechanisms, such as a microphone for speech, a touch-sensitive screen for gesture or graphical input, keyboard, mouse, motion input, speech and so forth. An output device 2235 can also be one or more of a number of output mechanisms known to those of skill in the art. In some instances, multimodal systems can enable a user to provide multiple types of input to communicate with the computing system architecture 2200. The communications interface 2240 can generally govern and manage the user input and system output. There is no restriction on operating on any particular hardware arrangement and therefore the basic features here may easily be substituted for improved hardware or firmware arrangements as they are developed.

Storage device 2230 is a non-volatile memory and can be a hard disk or other types of computer readable media which can store data that are accessible by a computer, such as magnetic cassettes, flash memory cards, solid state memory devices, digital versatile disks, cartridges, RAMs 2225, ROM 2220, and hybrids thereof.

The storage device 2230 can include services 2232, 2234, 2236 for controlling the processor 2210. Other hardware or software modules are contemplated. The storage device 2230 can be connected to the system connection 2205. In one aspect, a hardware module that performs a particular function can include the software component stored in a computer-readable medium in connection with the necessary hardware components, such as the processor 2210, connection 2205, output device 2235, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
  receiving in real-time a set of user attributes associated with a user, wherein the set of user attributes correspond to user interactions with one or more applications and user account data;
  dynamically training a machine learning model to generate a set of clusters from a dataset including historical data associated with a set of other users, wherein the historical data includes different sets of user attributes associated with the set of other users and previously provided real-time offers made to the set of other users;

dynamically identifying a cluster from the set of clusters based on the set of user attributes, wherein the cluster is identified by the machine learning model according to user attributes corresponding to users associated with the cluster and the set of user attributes associated with the user;

determining in real-time an offer for the user, wherein the offer is determined by the machine learning model and based on the identified cluster, and wherein the offer includes a dynamic range of parameters for customization of the offer;

providing the offer, wherein when the offer is received by a user device associated with the user, the user device presents the offer;

receiving an input corresponding to the offer, wherein the input includes selection of one or more parameters from the dynamic range of parameters;

sending an offer confirmation, wherein the offer confirmation corresponds to the selection of the one or more parameters; and modifying the machine learning model in real-time, wherein the machine learning model is modified by updating the dataset to include the set of user attributes, the offer, and the selection of the one or more parameters, and wherein the updated dataset is used to update the set of clusters.

2. The computer-implemented method of claim 1, further comprising:
calculating an offer probability corresponding to the offer, wherein the offer probability is calculated based on the set of user attributes and the cluster, and wherein the offer is provided according to the offer probability.

3. The computer-implemented method of claim 1, wherein the dynamic range of parameters include an offer amount range, an offer term range, a pre-payment range, and an interest range.

4. The computer-implemented method of claim 1, wherein the set of user attributes includes at least one of a bank account information, offer history, and user preferences.

5. The computer-implemented method of claim 1, further comprising:
determining that the input was received after a pre-determined amount of time.

6. The computer-implemented method of claim 1, further comprising:
determining that the offer is in compliance with an offer policy, wherein the offer policy includes at least one of a credit score requirement, a debt-to-income ratio requirement, a minimum bank account balance requirement, and an average daily bank account balance requirement.

7. The computer-implemented method of claim 1, wherein the offer includes a temporal threshold, and wherein the temporal threshold corresponds to a pre-determined period of time after which the offer is expired.

8. A system comprising:
one or more processors; and
memory storing thereon instructions that, as a result of being executed by the one or more processors, cause the system to:
receive in real-time a set of user attributes associated with a user, wherein the set of user attributes correspond to user interactions with one or more applications and user account data;
dynamically train a machine learning model to generate a set of clusters from a dataset including historical data associated with a set of other users, wherein the historical data includes different sets of user attributes associated with the set of other users and previously provided real-time offers made to the set of other users;

dynamically identify a cluster from the set of clusters based on the set of user attributes, wherein the cluster is identified by the machine learning model according to user attributes corresponding to users associated with the cluster and the set of user attributes associated with the user;

determine in real-time a real-time offer for the user by the machine learning model, wherein the real-time offer is determined in real-time based on the identified cluster, and wherein the real-time offer includes a dynamic range of parameters for customization of the real-time offer;

provide the real-time offer, wherein when the real-time offer is received by a user device associated with the user, the user device presents the real-time offer;

receive an input corresponding to the real-time offer, wherein the input includes selection of one or more parameters from the dynamic range of parameters;

send an offer confirmation, wherein the offer confirmation corresponds to the selection of the one or more parameters from the dynamic range of parameters; and modify the machine learning model in real-time, wherein the machine learning model is modified by updating the dataset to include the set of user attributes, the real-time offer, and the selection, and wherein the updated dataset is used to update the set of clusters.

9. The system of claim 8, wherein the instructions further cause the system to:
determine that the real-time offer is in compliance with an offer policy, wherein the offer policy includes at least one of a credit score requirement, a debt-to-income ratio requirement, a minimum bank account balance requirement, and an average daily bank account balance requirement.

10. The system of claim 8, wherein the instructions further cause the system to:
calculate an offer probability corresponding to the real-time offer, wherein the offer probability is calculated based on the set of user attributes and the cluster, and wherein the real-time offer is provided according to the offer probability.

11. The system of claim 8, wherein the dynamic range of parameters include an offer amount range, an offer term range, a pre-payment range, and an interest range.

12. The system of claim 8, wherein the set of user attributes includes at least one of a bank account information, offer history, and user preferences.

13. The system of claim 8, wherein the instructions further cause the system to:
determine that the input was received after a pre-determined amount of time.

14. The system of claim 8, wherein the real-time offer includes a temporal threshold, and wherein the temporal threshold corresponds to a pre-determined period of time after which the real-time offer is expired.

15. A non-transitory, computer-readable storage medium storing thereon executable instructions that, as a result of being executed by one or more processors of a computer system, cause the computer system to:

receive in real-time a set of user attributes associated with a user, wherein the set of user attributes correspond to user interactions with one or more applications and user account data;

dynamically train a machine learning model to generate a set of clusters from a dataset including historical data associated with a set of other users, wherein the historical data includes different sets of user attributes associated with the set of other users and previously provided real-time offers made to the set of other users;

dynamically identify a cluster from the set of clusters based on the set of user attributes, wherein the cluster is identified by the machine learning model according to user attributes corresponding to users associated with the cluster and the set of user attributes associated with the user;

determine in real-time an offer for the user, wherein the offer is determined by the machine learning model and based on the identified cluster, and wherein the offer includes a dynamic range of parameters for customization of the offer;

provide the offer, wherein when the offer is received by a user device associated with the user, the user device presents the offer;

receive an input corresponding to the offer, wherein the input includes selection of one or more parameters from the dynamic range of parameters;

send an offer confirmation, wherein the offer confirmation corresponds to the selection of the one or more parameters; and modify the machine learning model in real-time, wherein the machine learning model is modified by updating the dataset to include the set of user attributes, the offer, and the selection of the one or more parameters, and wherein the updated dataset is used to update the set of clusters.

16. The non-transitory, computer-readable storage medium of claim 15, wherein the executable instructions further cause the computer system to:
calculate an offer probability corresponding to the offer, wherein the offer probability is calculated based on the set of user attributes and the cluster, and wherein the offer is provided according to the offer probability.

17. The non-transitory, computer-readable storage medium of claim 15, wherein the executable instructions further cause the computer system to:
determine that the offer is in compliance with an offer policy, wherein the offer policy includes at least one of a credit score requirement, a debt-to-income ratio requirement, a minimum bank account balance requirement, and an average daily bank account balance requirement.

18. The non-transitory, computer-readable storage medium of claim 15, wherein the dynamic range of parameters include an offer amount range, an offer term range, a pre-payment range, and an interest range.

19. The non-transitory, computer-readable storage medium of claim 15, wherein the set of user attributes includes at least one of a bank account information, offer history, and user preferences.

20. The non-transitory, computer-readable storage medium of claim 15, wherein the executable instructions further cause the computer system to:
determine that the input was received after a pre-determined amount of time.

21. The non-transitory, computer-readable storage medium of claim 15, wherein the offer includes a temporal threshold, and wherein the temporal threshold corresponds to a pre-determined period of time after which the offer is expired.

* * * * *